(12) United States Patent
Gutmann et al.

(10) Patent No.: US 7,912,583 B2
(45) Date of Patent: Mar. 22, 2011

(54) ENVIRONMENT MAP BUILDING METHOD, ENVIRONMENT MAP BUILDING APPARATUS AND MOBILE ROBOT APPARATUS

(75) Inventors: Steffen Gutmann, Tokyo (JP); Masaki Fukuchi, Kanagawa (JP); Kohtaro Sabe, Tokyo (JP); James R. Bruce, Pittsburgh, PA (US)

(73) Assignee: Sony Corporation, Tokyo (JP)

( * ) Notice: Subject to any disclaimer, the term of this patent is extended or adjusted under 35 U.S.C. 154(b) by 1069 days.

(21) Appl. No.: 11/165,047

(22) Filed: Jun. 24, 2005

(65) Prior Publication Data
US 2006/0025888 A1    Feb. 2, 2006

(30) Foreign Application Priority Data

Jun. 25, 2004   (JP) ................................ P2004-188868

(51) Int. Cl.
*G06F 19/00*   (2006.01)
*G01C 21/00*   (2006.01)
(52) U.S. Cl. ........ 700/245; 700/253; 700/261; 700/258; 701/217; 701/23
(58) Field of Classification Search ............... 345/419, 345/422; 701/217, 23; 700/259, 245, 261, 700/258; 180/8.1, 8.2, 8.5, 9.1; 280/5.2
See application file for complete search history.

(56) References Cited

U.S. PATENT DOCUMENTS
5,006,988 A    4/1991   Borenstein et al.
5,819,016 A * 10/1998  Watanabe et al. ............. 345/419

(Continued)

FOREIGN PATENT DOCUMENTS
EP   1 541 295 A1   6/2005

(Continued)

OTHER PUBLICATIONS

Hans Moravec, *Robust Navigation by Probabilistic Volumetric Sensing*, Feb. 24, 2002, Carnegie Mellon University, DARPA MARS Program Research Progress, retrieved from: <http://www.frc.ri.cmu.edu/~hpm/project.archive/robot.papers/2002/ARPA.MARS/Report.0202.html> [retrieved on Jun. 21, 2005].

(Continued)

*Primary Examiner* — Khoi Tran
*Assistant Examiner* — Ian Jen
(74) *Attorney, Agent, or Firm* — Finnegan, Henderson, Farabow, Garrett & Dunner, L.L.P.

(57) ABSTRACT

An environment map building method and an environment map building apparatus can express the surrounding embodiment with a high resolution in the height direction in a manner robust relative to observation noises. The present invention provides an environment map building apparatus for building a three-dimensional environment map to be used for three-dimensionally determining a region allowing a moving body to move therein according to external environment conditions, which comprises an external environment conditions detecting section that detects external environment conditions, a three-dimensional map building section that builds a three-dimensional map showing the state of occupancy of a three-dimensional grid on the basis of the external environment conditions detected by the external environment conditions detecting section, a relative-to-base-plane height map building section that builds a relative-to-base-plane height map showing heights from a two-dimensional base plane on the basis of the external environment conditions detected by the external environment conditions detecting section, and a height map information modifying section that modifies the information of the relative-to-base-plane height map on the basis of the information on the three-dimensional map.

13 Claims, 36 Drawing Sheets

U.S. PATENT DOCUMENTS

| | | | |
|---|---|---|---|
| 5,977,979 A * | 11/1999 | Clough et al. | 345/422 |
| 6,961,055 B2 * | 11/2005 | Doak et al. | 345/419 |
| 2001/0037378 A1 | 11/2001 | Hirayama | |
| 2004/0013295 A1 * | 1/2004 | Sabe et al. | 382/153 |
| 2004/0167669 A1 * | 8/2004 | Karlsson et al. | 700/259 |
| 2004/0167670 A1 * | 8/2004 | Goncalves et al. | 700/259 |
| 2004/0167688 A1 * | 8/2004 | Karlsson et al. | 701/23 |
| 2004/0167716 A1 * | 8/2004 | Goncalves et al. | 701/217 |
| 2004/0168148 A1 * | 8/2004 | Goncalves et al. | 717/104 |
| 2004/0249504 A1 | 12/2004 | Gutmann et al. | |
| 2005/0131581 A1 | 6/2005 | Sabe et al. | |

FOREIGN PATENT DOCUMENTS

| | | |
|---|---|---|
| JP | 2003-269937 A | 9/2003 |
| JP | 2004-070475 | 3/2004 |
| WO | WO 2004/018159 | 3/2004 |

OTHER PUBLICATIONS

Satoshi Kagami et al., *Vision-Based 2.5D Terrain Modeling for Humanoid Locomotion*, Proceedings of the 2003 IEEE International Conference on Robotics & Automation, Taipei, Taiwan, Sep. 14-19, 2003, pp. 2141-2146.

Japanese Office Action mailed Nov. 24, 2009 in Application No. JP 2004-188868 (2 pages).

* cited by examiner

4cm × 30cm × 10cm/21cm

3cm × 33cm × 12cm/32cm

ENVIRONMENT MAP BUILDING METHOD, ENVIRONMENT MAP BUILDING APPARATUS AND MOBILE ROBOT APPARATUS

CROSS REFERENCE TO RELATED APPLICATIONS

The present invention contains subject matter related to Japanese Patent Application JP 2004-188868 filed in Japanese Patent Office on Jun. 25, 2004, the entire contents of which being incorporated herein by reference.

BACKGROUND OF THE INVENTION

1. Field of the Invention

This invention relates to an environment map building method and an environment map building apparatus for acquiring information within an environment and building an environment map and also to a mobile robot apparatus having a moving means such as legs and adapted to move, recognizing the obstacles within an environment where it is located.

2. Description of the Related Art

Unlike industrial robots, autonomous robot apparatus can autonomously act according to the external environment conditions of the surroundings and the internal conditions of the robot itself. Therefore, for example, autonomous robot apparatus are required to detect external obstacles and form a plan for its own moving route free from obstacles. Known robot apparatus include those that can build an obstacle map showing the obstacles in the environment where it is situated and decide its own moving route according to the built map.

Various studies have been and being made on algorithms for detecting a plane from the three-dimensional distance information that a mobile robot apparatus has acquired. The detected plane can be used, for example, by the mobile robot apparatus for avoiding obstacles and stepping up and down on staircases as well as for other purposes.

There has been proposed a technique of causing a robot apparatus to detect a plane from distance information, express the surrounding environment of the robot apparatus by means of a two-dimensional grid and move in the direction indicated by the linear sum of the repulsive force from all the detected obstacles and the attractive force relative to the target ([Patent Document 1]: U.S. Pat. No. 5,006,988).

According to another proposed technique, a robot apparatus that can estimate if there is an obstacle or not by detecting the floor surface by means of the distance information it acquires and identify the surrounding environment is realized by causing the robot apparatus to express the surrounding environment thereof by means of an environment map, which provides map information on a coordinate system centered at the robot apparatus, divide the environment into grid cells of a predetermined size so as to be able to hold the probability of existence of an obstacle in each grid of the map and treat each grid that shows a probability of existence exceeding a threshold value as an obstacle ([Patent Document 2]: Japanese Patent Application Laid-Open Publication No. 2003-269937). According to another technique achieved by developing the technique of the Patent Document 2, the two-dimensional grids are extended and the environment is expressed by means of a plurality of two-dimensional grids that are parallel to the horizontal plane. With this technique, planes of different heights are expressed by means of a plurality of two-dimensional grids.

There has been proposed another technique of acquiring three-dimensional information on the surrounding environment by surveying it by means of a stereovision and expressing the surrounding environment by means of three-dimensional grids (see, inter alia, [Non-Patent Document 1]: H. Moravec. "Robust Navigation by Probabilistic Volumetric Sensing", DARPA MARS program research progress, 2002). According to still another technique, the surrounding environment of a robot apparatus is expressed by applying height information to each of two-dimensional grids by means of a 2.5-dimensional (2.5-D) height map that is drawn by assigning only an analog value of height information to each grid on the basis of three-dimensional information acquired by means of a stereovision (see, inter alia, [Non-Patent Document 2]: Kagami et al. (S. Kagami, K. Nishiwaki, J. J. Kuffner, K. Okada, M. Inaba, H. Inoue) Vision-based 2.5D terrain modeling for humanoid locomotion, Int. Conf. on Robotics and Automation (ICRA), 2003).

SUMMARY OF THE INVENTION

The techniques of the Patent Documents 1 and 2 become unsatisfactory as the moving body (the mobile robot apparatus) is improved for its performance and become capable of adapting itself to steps, slopes and other changes of the surface where it moves because the surrounding environment is expressed by means of a two-dimensional map. In other words, information acquired in a vertical direction becomes necessary.

However, to increase the resolution in a vertical direction, techniques including the one described in the Non-Patent Document 3 that tries to accurately express the surrounding environment by analyzing it by means of three-dimensional grids formed by laying grids in the height direction inevitably involve a large number of grids that needs to be observed if compared with techniques of treating the surrounding environment by means of two-dimensional grids.

For example, when a box-shaped space on a 4 meters square that stands 1 meter high is expressed by means of three-dimensional grids, each unit grid (to be referred to as cell whenever appropriate) providing a horizontal resolution of 4 centimeters and a vertical resolution of 1 centimeter, a total of 100×100×100=1,000,000 cells will be required. The volume of computations necessary for statistically treating the probabilities of existence of obstacle for the 1,000,000 cells is enormous and requires a large memory capacity. Therefore, it is difficult to apply this technique to a bipedal robot (humanoid robot) because the information processing device that can be mounted in the robot and the detector necessary for acquiring information are subjected to dimensional limitations. Additionally, if the humanoid robot cannot analyze the surrounding environment with a resolution higher than 4 cm in a vertical direction, the robot can hardly step up a staircase or stride an obstacle. In other words, the humanoid robot is required to show a vertical resolution of about 4 mm. Then, the number of grids has to be increased to ten times of the above number. Thus, the problem of the volume of computations and the memory capacity that are necessary for recognizing the surrounding environment to an enhanced level of precision will be insurmountable.

The technique of the Non-Patent Document 2 that utilizes a 2.5-dimensional (2.5-D) height map can reduce the volume of information necessary for analyzing the surrounding environment if compared with a technique of using three-dimensional grids and is beneficial because the vertical resolution is held as an analog value for each grid and hence it is possible to highly accurately express the surrounding environment with a volume of data much smaller than its counterpart for three-dimensional grids.

However, there can arise problems attributable to the fact that the volume of information is reduced if compared with the use of three-dimensional grids. One of such problems is that, if a plane that was observed last time is missing, the environment will be recognized only insufficiently with a 2.5-D height map. A situation where a mobile robot apparatus adapted to express the surrounding environment by means of a 2.5-D map cannot update the 2.5-D height map will be discussed below by referring to FIGS. 1 and 2 of the accompanying drawings.

FIG. 1 illustrates an environment in cross section where planes A and B exist in front of a mobile robot 400. The mobile robot 400 observes the planes A and B located within visual field region SS by means of stereovision 401 and draws a 2.5-D height map. A plane that includes the soles of the mobile robot (not shown) is used as base plane that is referred to as grid G410 for the purpose of explanation so as to make the built 2.5-D height map correspond to the actual environment. One of the cells S of the grid G410 corresponds to a grating 1 when the surrounding environment of the mobile robot is divided and expressed by a predetermined resolution. Assume here, as an example, that a space of a four meters cube is divided into a horizontal resolution of four centimeters. For the convenience of description, the cells are referred to as $S_1, S_2, \ldots, S_n$ from an end of the visual field region.

The mobile robot 400 observes the environment at predetermined regular time intervals by means of the stereovision 401 and updates the grid G410 at each time of observation. The cells $S_1$ through $S_n$ are substituted by the height of the plane A, or 100 mm, as height information. Now, assume that the plane A is missing because it has moved out as shown in FIG. 2. Then, the mobile robot 400 detects the plane B that has been hidden by the plane A at the next observation. While the height information is updated for the cells $S_4$ through $S_{15}$ that are included in the plane B and the height of the plane B is substituted by 50 mm, the mobile robot cannot see (observe) the cells $S_1$ through $S_3$ that are recognized as being included in the plane A and not included in the plane B in the situation of FIG. 2 so that it keeps on holding the height information of the plane A, or 100 mm.

While the instance illustrated in FIGS. 1 and 2 represents an unusual change in the environment that is caused by a move or loss of a plane (obstacle) out of the environment, an observation noise of the stereovision 401 or a plane detector for detecting a plane from the observation data of the stereovision 401 can give rise to such a change more often than not. For example, a problem that an obstacle that does not actually exist remains in an unupdatable region on the grid G410 can arise when a plane detector transmits an observation noise that may appear like an error detection signal and tells that a plane or an obstacle that does not actually exist is detected.

In view of the above identified circumstances, it is desirable to provide an environment map building apparatus, an environment map building method and a mobile robot apparatus that show resistance to a high degree against observation noises and can express the surrounding environment with a high degree of resolution in the direction of height. It is also desirable to provide an environment recognizing program for causing a computer to execute an environment recognizing method that shows resistance to a high degree against observation noises and can express the surrounding environment with a high degree of resolution in the direction of height.

According to the present invention, there is provided an environment map building method for building a three-dimensional environment map to be used for three-dimensionally determining a region allowing a moving body to move therein according to external environment conditions, the method comprising: an external environment conditions detecting step of detecting external environment conditions; a three-dimensional map building step of building a three-dimensional map showing the state of occupancy of a three-dimensional grid on the basis of the external environment conditions detected in the external environment conditions detecting step; a relative-to-base-plane height map building step of building a relative-to-base-plane height map showing heights from a two-dimensional base plane on the basis of the external environment conditions detected in the external environment conditions detecting step; and a height map information modifying step of modifying the information of the relative-to-base-plane height map on the basis of the information on the three-dimensional map; the relative-to-base-plane height map being complemented by the three-dimensional environment map.

Particularly, in the height map information modifying step, height information is acquired from the relative-to-base-plane height map and made to correspond to the height coordinates of the three-dimensional map. Then, the occupancy probability of each unit grid is compared with a threshold value to see if it is greater or smaller than the threshold value for determining if the unit grid represents an obstacle in the three-dimensional grid or not. The unit grid is determined to be not an obstacle if it is determined that the occupancy probability is smaller than the threshold value, whereas the unit grid is determined to be an obstacle and the corresponding height information of the relative-to-base-plane height map is modified if it is determined that the occupancy probability is greater than the threshold value.

Preferably, the plane detecting step includes: a line segment extracting step of extracting a line segment for each group of distance data points estimated to be on a same plane in a three-dimensional space; and a plane region extending step of extracting a plurality of line segments estimated to be belonging to a same plane from the group of line segments extracted in the line segment extracting step and computationally determining a plane from the plurality of line segments; the line segment extracting step being adapted to detect a plane by adaptively extracting line segments according to the distribution of distance data points.

According to the present invention, there is provided an environment map building apparatus for building a three-dimensional environment map to be used for three-dimensionally determining a region allowing a moving body to move therein according to external environment conditions, the apparatus comprising: an external environment conditions detecting means for detecting external environment conditions; a three-dimensional map building means for building a three-dimensional map showing the state of occupancy of a three-dimensional grid on the basis of the external environment conditions detected by the external environment conditions detecting means; a relative-to-base-plane height map building means for building a relative-to-base-plane height map showing heights from a two-dimensional base plane on the basis of the external environment conditions detected by the external environment conditions detecting means; and a height map information modifying means for modifying the information of the relative-to-base-plane height map on the basis of the information on the three-dimensional map; the relative-to-base-plane height map being complemented by the three-dimensional environment map.

According to the present invention, there is provided a mobile robot apparatus movable by means of a moving means, the robot apparatus comprising: an external environment conditions detecting means for detecting external environment conditions; a three-dimensional map building means for building a three-dimensional map showing the state of occupancy of a three-dimensional grid on the basis of the external environment conditions detected by the external environment conditions detecting means; a relative-to-base-plane height map building means for building a relative-to-base-plane height map showing heights from a two-dimensional base plane on the basis of the external environment conditions detected by the external environment conditions detecting means; a height map information modifying means for modifying the information of the relative-to-base-plane height map on the basis of the information on the three-dimensional map; and a movement control means for autonomously determining the moving route, using the map information modified by the height map information modifying means as environment map and controlling the moving actions.

Thus, according to the invention for detecting external environment conditions, building a three-dimensional map showing the state of occupancy of a three-dimensional grid on the basis of the detected external environment conditions, building a relative-to-base-plane height map showing heights from a two-dimensional base plane on the basis of the detected external environment conditions and modifying the information of the relative-to-base-plane height map on the basis of the information on the three-dimensional map, it is possible to express the surrounding environment with a reduced load of arithmetic operations if compared with a three-dimensional grid showing a comparable degree of resolution, a high degree of robustness relative to observation noises and a high degree of resolution in the height direction.

BRIEF DESCRIPTION OF THE DRAWINGS

FIGS. 16A through 16C are schematic illustrations of a staircase, in which FIG. 16A is a schematic frontal perspective view of the staircase; FIG. 16B is a schematic lateral perspective view of the staircase, and FIG. 16C is a schematic oblique perspective view of the staircase;

FIGS. 17A through 17C are schematic illustrations of another staircase, in which FIG. 17A is a schematic frontal perspective view of the staircase; FIG. 17B is a schematic lateral perspective view of the staircase; and FIG. 17C is a schematic oblique perspective view of the staircase;

DETAILED DESCRIPTION OF THE PREFERRED EMBODIMENTS

Now, the present invention will be described in greater detail by referring to the accompanying drawings that illustrate preferred embodiments of the invention. More specifically, an embodiment of environment map building apparatus adapted to recognize the surrounding environment including obstacles and steps by means of a plurality of planes extracted from the distance information (distance data) acquired by means of a stereovision system and expressing the surrounding environment as an environment map and an embodiment of mobile robot apparatus realized by applying the embodiment of environment map building apparatus will be described below.

Figure 3:
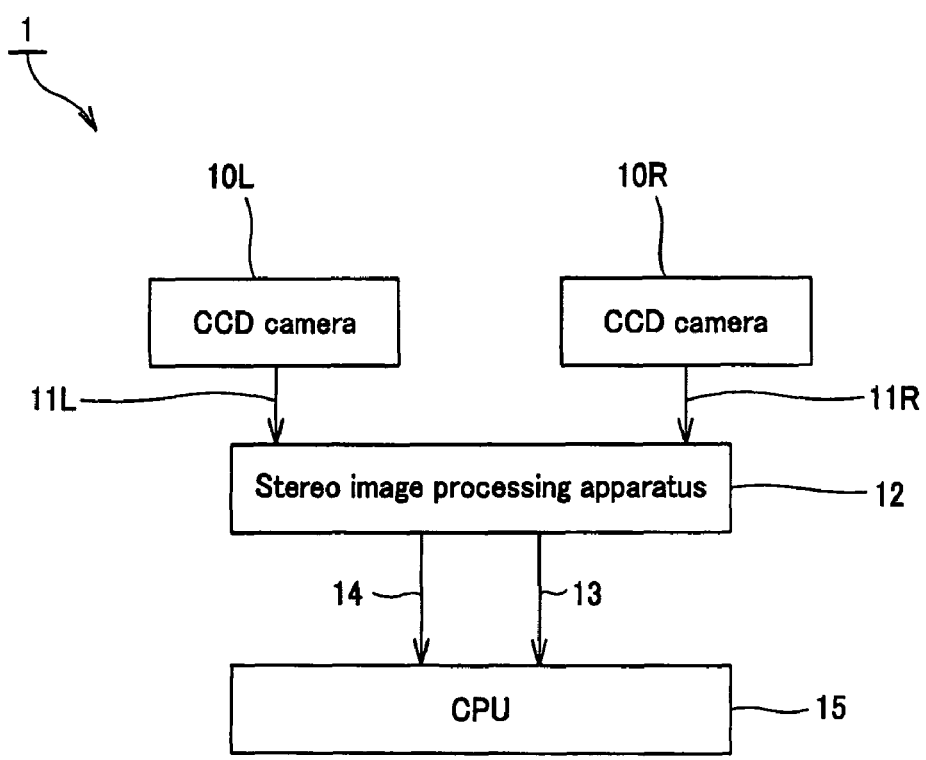
FIG. 3 is a schematic block diagram of an embodiment of environment map building apparatus, showing the configuration thereof.

FIG. 3 is a schematic block diagram of the embodiment of environment map building apparatus, showing the configuration thereof. Referring to FIG. 3, the environment map building apparatus 1 comprises a pair of CCD cameras 10R, 10L and a stereo image processing apparatus 12 arranged downstream relative to the CCD cameras 10R, 10L, (R and L being suffixes indicating right and left respectively throughout this letter of specification). The right image 11R and the left image 11L picked up by the two CCD cameras are input to stereo image processing apparatus 12, which stereo image processing apparatus 12 computationally determines disparity data (distance information) of the images 11R, 11L and then a color image (YUV: luminance Y, UV color difference) 13 and a parallax image (YDR: luminance Y, parallax D, reliability R) 14 alternately for the left and right CCD cameras in each frame. The term "parallax" as used herein refers to the difference between the image of a point in space as picked up by the left side camera and that of the point as picked up by the right side camera. It changes as a function of the distance from each of the cameras. The color image 12 and the parallax image 13 are input to CPU (control section) 15. The CPU 15 receives the color image 13 and the parallax image 14 from the stereo image processing apparatus 12 as inputs and builds an environment map by means of software having a configuration as will be described hereinafter.

Now, the system for executing a process down to expressing an environment in the form of an environment map on the basis of the stereo data acquired by the environment map building apparatus 1 by means of the CCD cameras 10L, 10R will be described below by referring to the functional block diagram of FIG. 4.

Figure 4:
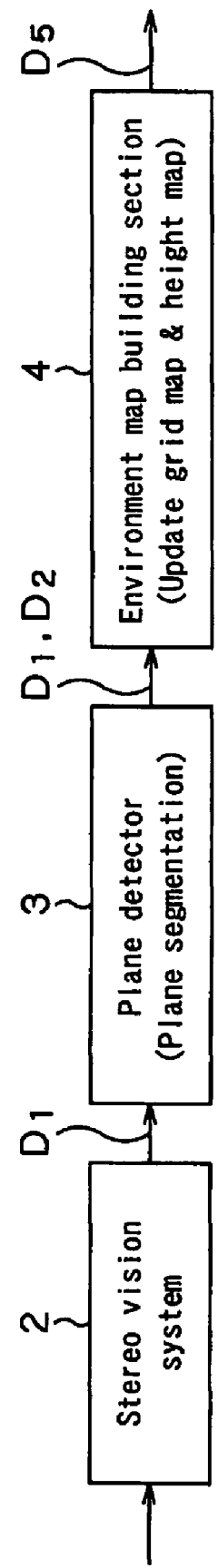
FIG. 4 is a schematic functional block diagram of the system for executing a process down to expressing an environment in the form of an environment map on the basis of the stereo data acquired by the embodiment of environment map building apparatus of FIG. 3.

Referring to FIG. 4, the environment map building apparatus 1 comprises a stereovision system 2 that operates as distance data metering means for acquiring three-dimensional distance data, a plane (segmentation) detector 3 for receiving stereo data D1 from the stereovision system 2 and detecting one or more than one planes in the environment from the stereo data D1 and an environment map building section 4 for updating the environment map, which will be described in greater detail hereinafter from the plane data D2 output from the plane detector 3 and outputting an environment map data D5 (for updating a grid map and a height map).

Figure 5:
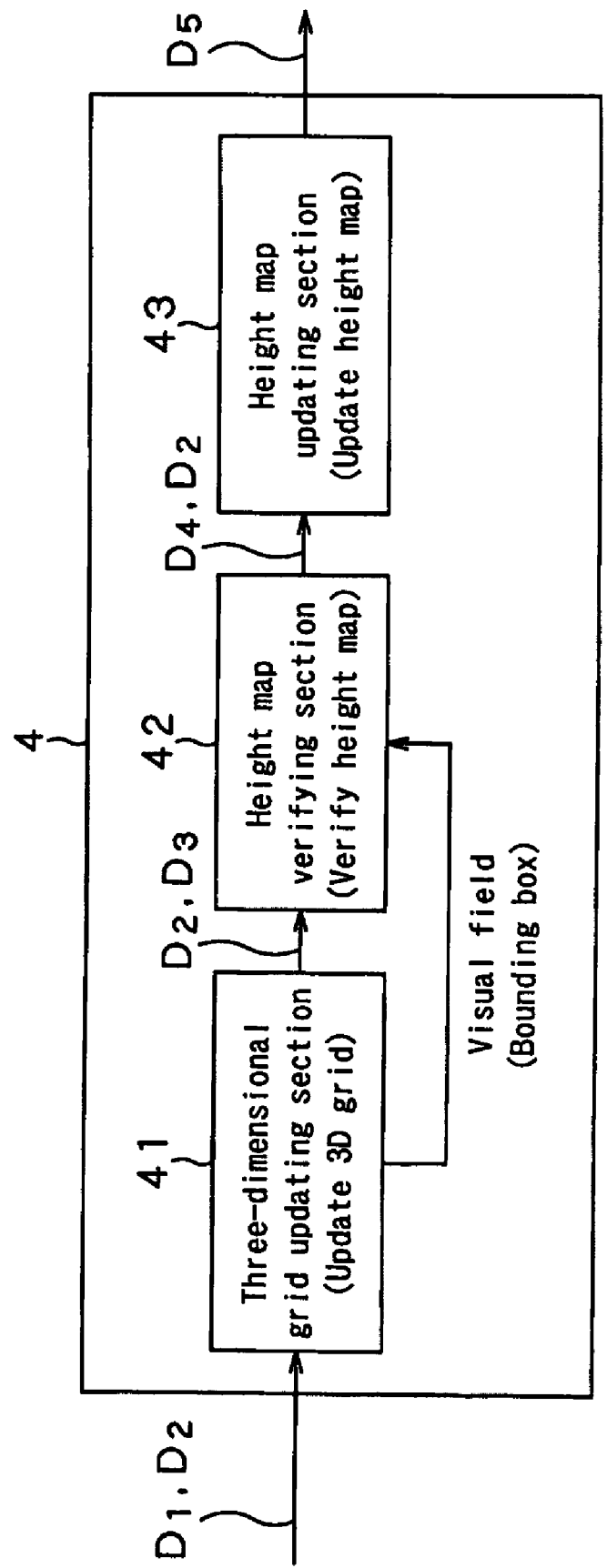
FIG. 5 is a schematic functional block diagram of the system for executing a process of building an environment map in an environment map building section of the embodiment of environment map building apparatus of FIG. 3.

Now referring to FIG. 5, the environment map building section 4 by turn includes a three-dimensional grid updating section 41 for building a three-dimensional environment map (to be referred to as three-dimensional grid hereinafter) or updating it on the basis of the detected surrounding environment, a height map verifying section 42 for verifying the height map on the basis of the obstacle probability data D3 transmitted from the three-dimensional grid updating section 41 and a height map updating section 43 for updating the height information of the height map on the basis of the outcome of the verification.

The three-dimensional environment map (three-dimensional grid) built by the three-dimensional grid updating section 41 expresses the surrounding environment by dividing an image of the surrounding environment into grids having predetermined horizontal and vertical dimensions. More specifically, the three-dimensional grid updating section 41 expresses a three-dimensional environment map as a set of unit grids (to be referred to cells hereinafter), each cell corresponding to a box-shaped space that is horizontally four centimeters long and four centimeters wide to provide a horizontal resolution of four centimeters but one centimeter high to provide a vertical resolution of one centimeter. The three-dimensional grid updating section 41 assigns a probability with which each cell is occupied by an object and modifies the probability of occupation of each cell on the basis of observation data. A threshold value is provided for the probability of occupation and the state of the environment is expressed as a map according to whether the probability of occupation of each cell is greater than the threshold value or not.

In this embodiment, since the resolution in the height direction does not depend on the cell resolution, the vertical resolution can be made to be coarser than one centimeter. The three-dimensional grid updating section 41 updates the built three-dimensional grid on the basis of the stereo data D1 and the plane data D2 and outputs the updated three-dimensional grid to the height map verifying section 42.

The height map verifying section 42 builds a relative-to-base-plane height map that expresses the height from a two-dimensional base plane on the basis of the stereo data D1. The relative-to-base-plane height map is a map that expresses an environment by discriminating a detected plane by means of information showing the height from a two-dimensional base plane. It is referred to as 2.5-D height map for the purpose of the present invention because it does not contain information on planes parallel to the vertical direction (Z-axis) unlike a three-dimensional grid. Additionally, a 2.5-D height map is made to correspond to the three-dimensional grid built by the three-dimensional grid updating section 41 by applying a coordinate system to make it a map for the region same as that of the three-dimensional grid so as to make it possible to identify any specific region in the 2.5-D height map. The height map verifying section 42 compares the height information on the cells of the three-dimensional grid and the height information of the cells of the 2.5-D height map and verifies the height map.

The height map updating section 43 modifies the information on the relative-to-base-plane height map on the basis of the information on the three-dimensional map. In other words, whenever necessary, it executes a process of updating the height information of the 2.5-D height map on the basis of the plane data D2 and the obstacle probability data D3 of the three-dimensional grid.

Thus, the environment map building apparatus 1 firstly observes the surrounding environment by means of the stereovision system 2 and outputs the stereo data D1 that is the three-dimensional distance information computed on the basis of the parallax images of the stereo-viewing cameras. More specifically, it compares the images input from the left and right cameras that correspond to the two eyes of human being for each pixel and its vicinity and estimates the distance to an object from the parallax images. Then, it outputs three-dimensional distance information as image (distance information). The environment map building apparatus 1 can recognize a plurality of planes existing in the surrounding environment by detecting them by means of the plane detector 3 from the stereo data D1. Additionally, the environment map building apparatus 1 builds an environment map that is divided into grids of predetermined horizontal and vertical dimensions for the surrounding environment acquired by the stereovision system 2 from the plane data D2 by means of the environment map building section 4. The environment map building apparatus 1 updates the environment map by means of the stereo data D1 and the plane data D2 and builds a 2.5-D height map by referring to the obstacle existing probabilities of the three-dimensional grid.

The function and the process of each block of the above described environment map building apparatus 1 will be discussed in greater detail hereinafter.

Now, an embodiment of mobile robot apparatus formed by applying an environment map building apparatus 1 and adapted to recognize the surrounding environment that may include obstacles and steps by means of a plurality of planes extracted from the distance information (distance data) acquired by a stereovision system and expressing it as an environment map will be described below. This mobile type robot apparatus is a biped type utility robot apparatus that supports human activities in various different scenes of daily life in a domestic environment or some other environment and is adapted to behave according to the internal state (anger, sorrow, joy, pleasure, etc.) thereof. Moreover, it is an entertainment robot apparatus that can express basic actions of man. The robot apparatus can form its own moving route, utilizing the environment map built by the environment map building apparatus 1.

Figure 6:
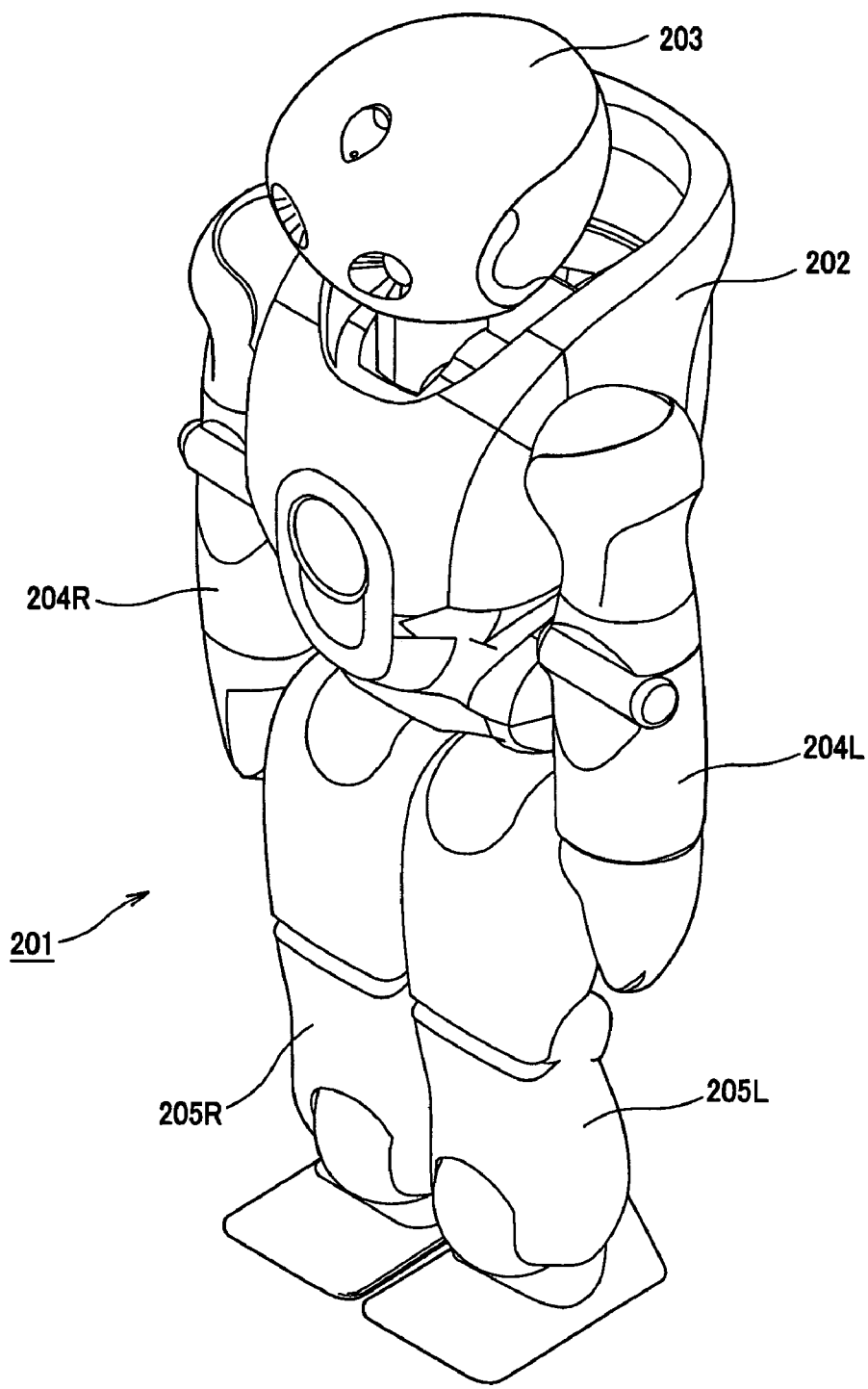
FIG. 6 is a schematic perspective view of an embodiment of robot apparatus according to the invention.

FIG. 6 is a schematic perspective view of this embodiment of robot apparatus according to the invention. Referring to FIG. 6, the robot apparatus 201 of this embodiment comprises a trunk unit 202, a head unit 203 linked to a predetermined position of the trunk unit 202, left and right arm units 204R/L and left and right leg units 205R/L, the arm units 204R/L and the leg units 204R/L also being linked to the trunk unit 202.

Figure 7:
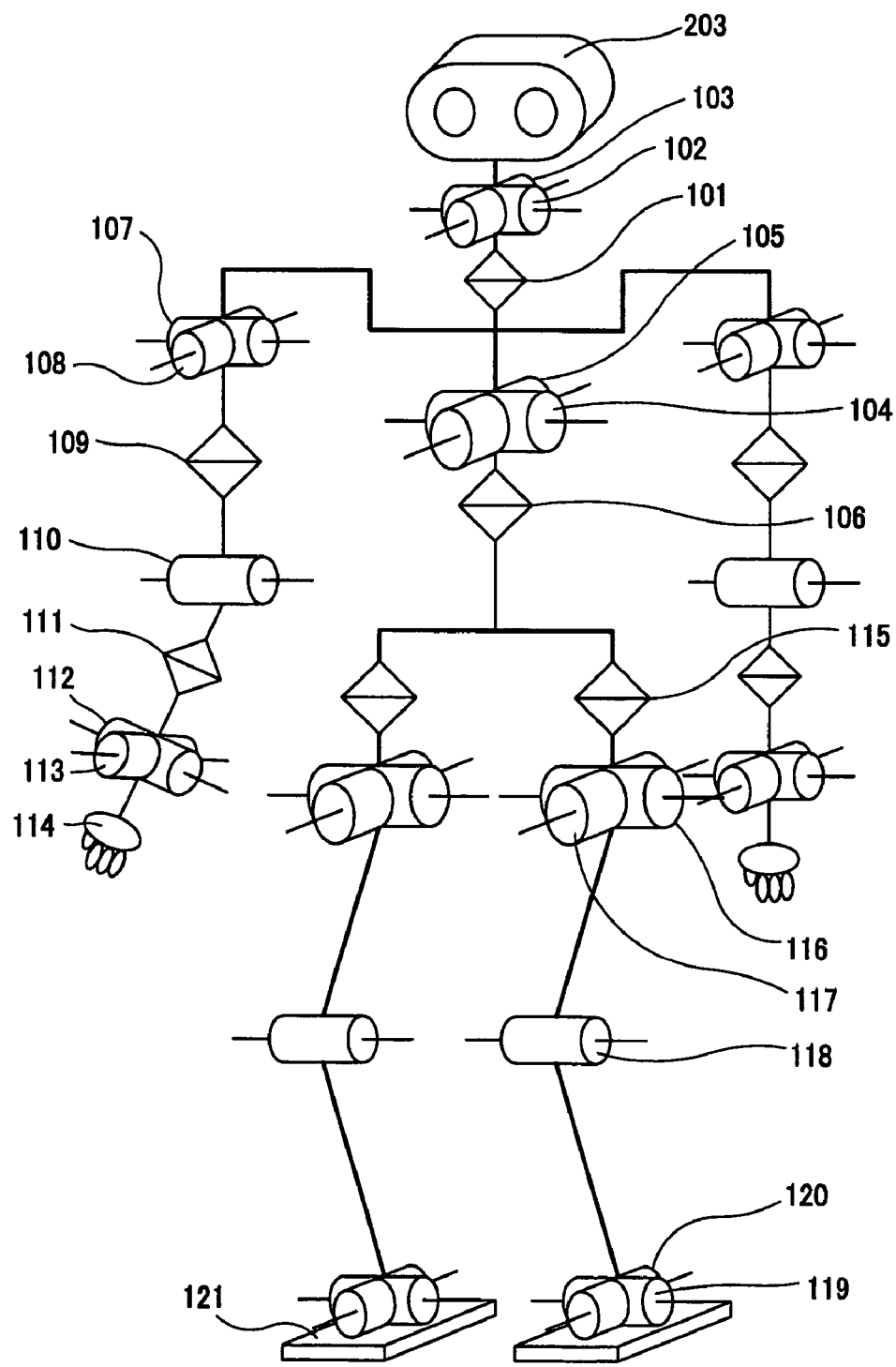
FIG. 7 is a schematic illustration of the degrees of freedom of the joints of the embodiment of robot apparatus of FIG. 6.

FIG. 7 schematically illustrates the degree of freedom of each of the joints of the robot apparatus 201. The neck joint that supports the head unit 203 has three degrees of freedom realized by a neck joint yaw axis 101, a neck joint pitch axis 102 and a neck joint roll axis 103.

Each of the arm units 204R/L, or the upper limb units, has a shoulder joint pitch axis 107, a shoulder joint roll axis 108, an upper arm yaw axis 109, a elbow joint pitch axis 110, a forearm yaw axis 111, a wrist joint pitch axis 112, a wrist joint roll axis 113 and a hand section 114. The hand section 114 is in fact a multi-joint multi-degree-of-freedom structure that includes a thumb and a plurality of fingers. However, since the action of the hand section 114 contributes to and influences little the attitude control and the locomotion control of the robot apparatus 201, it is assumed to have zero degrees of freedom in this letter of specification. Therefore, each of the arm units 204R/L has seven degrees of freedom.

The trunk unit 202 has a trunk pitch axis 104, a trunk roll axis 105 and a trunk yaw axis 106 and hens has three degrees of freedom Each of the leg units 205R/L, or the lower limb units, has a hip joint yaw axis 115, a hip joint pitch axis 116, a hip joint roll axis 117, a knee joint pitch axis 118, an ankle joint pitch axis 119, an ankle joint roll axis 120 and a foot section 121. In this letter of specification, the intersection of the hip joint pitch axis 116 and the hip joint roll axis 117 is defined as the hip joint position of the robot apparatus 201. The foot section is in fact a multi-joint multi-degree-of-freedom structure that includes a sole. However, the foot section 121 is assumed to have zero degrees of freedom in this letter of specification. Therefore, each of the leg units 205R/L has six degrees of freedom.

To summarize, the robot apparatus 201 has a total of $3+7\times 2+3+6\times 2=32$ degrees of freedom as a whole. However, entertainment robot apparatus are not necessarily limited to 32 degrees of freedom. It may be needless to say that the degrees of freedom and hence the number of joints can be increased or decreased appropriately depending on the restrictive conditions and the requirements of the specification to be met for designing and forming a robot.

Each of the degrees of freedom of the robot apparatus 201 is realized by means of an actuator. In view of the requirements to be met by a robot apparatus including that it should not have an excessively expanded appearance and should approximate the natural profile of man and that it should be controlled reliably for its attitude although it is an unstable structure designed for biped locomotion, each actuator is preferably compact and lightweight.

Figure 8:
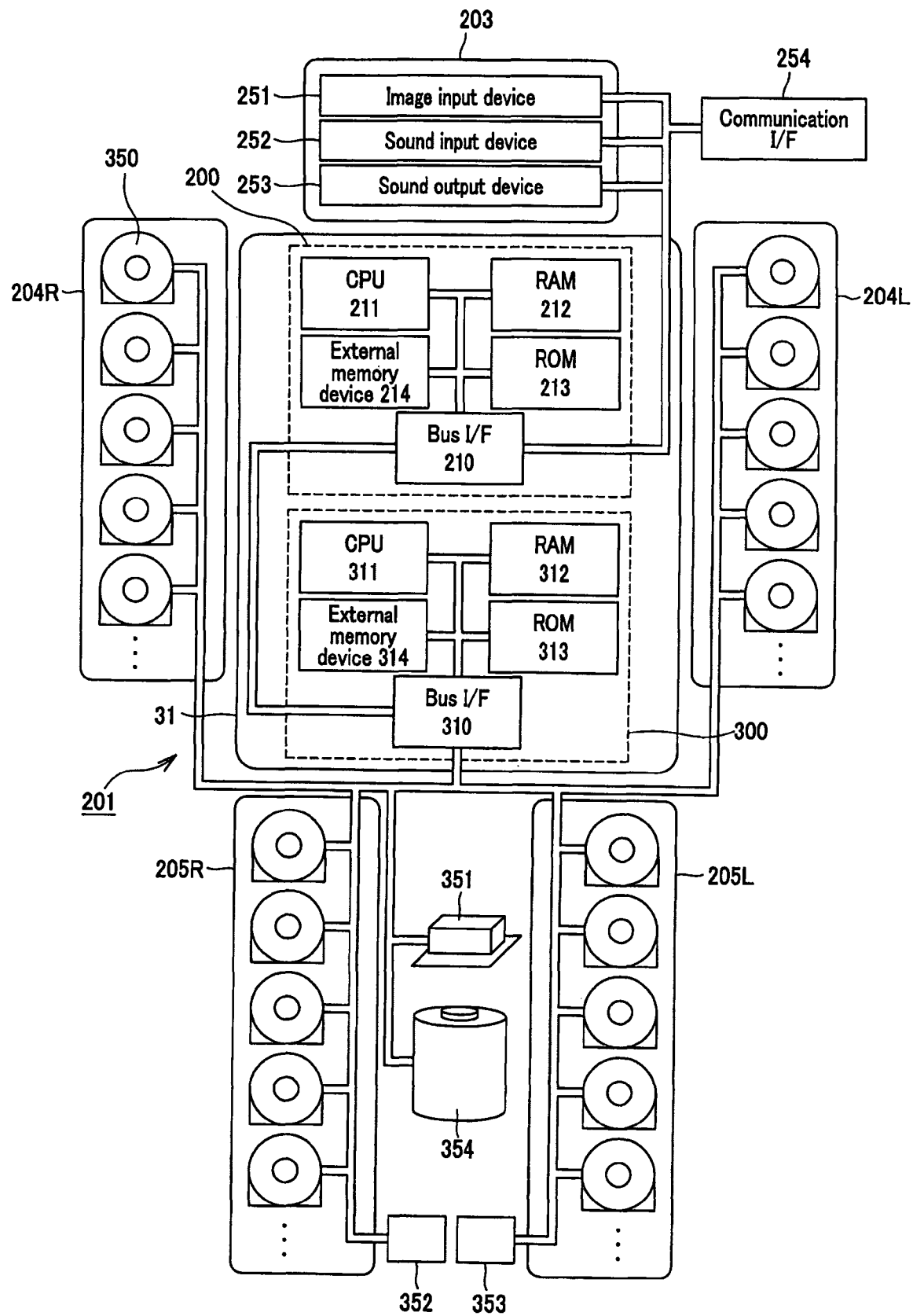
FIG. 8 is a schematic illustration of the control system of the embodiment of robot apparatus of FIG. 6.

The robot apparatus comprises a control system for controlling the overall motion of the robot apparatus that is typically arranged in the trunk unit 202. FIG. 8 is a schematic block diagram of the control system of the robot apparatus of 201. As shown in FIG. 8, the control system comprises a thinking control module 200 that controls the emotional judgment and the sentimental expression of the robot apparatus that dynamically respond to the user-related input or the like and a movement control module 300 for controlling the concerted movement of the whole body of the robot apparatus 201 that is driven to move by actuators 350.

The thinking control module 200 includes a CPU (central processing unit) 211 that executes arithmetic processing operations relating to the emotional judgment and the sentimental expression, a RAM (random access memory) 212, a ROM (read only memory) 213 and an external memory device (which may include a hard disc drive) 214. It is a stand-alone type information processing device that can process various pieces of information in a self-conclusive manner in the module itself.

The thinking control module 200 decides the current emotion and the current will of the robot apparatus 201 according to the external stimuli including the image data input from image input device 251 and sound data input from sound input device 252. As pointed out above, the robot apparatus 201 recognizes the expression of the user from the input image data and reflects the information to the sentiment and the will of the robot apparatus 201 so that the robot apparatus 201 can express its own action corresponding to the expression of the user. The image input device 251 typically comprises a plurality of CCD (charge coupled device) cameras, and can obtain distance information from the image picked up by these cameras. The sound input device 252 typically comprises a plurality of microphones.

The thinking control module 200 issues a command for carrying out an action or behavior sequence according to the decision made by the robot apparatus 1 by moving the four limes, to the movement control module 300.

On the other hand, the movement control module 300 comprises a CPU 311 for controlling the concerted movement of the entire body of the robot apparatus 201, a RAM 312, a ROM 313 and an external memory device (which may include a hard disc drive) 314. It is a stand-alone type information processing device that can process various pieces of information in a self-conclusive manner in the module itself. The external memory device 314 can accumulate walking patterns, ZMP trajectories and other behavior plans computationally determined on an offline basis.

The movement control module 300 is connected to various devices of the robot apparatus 201, shown in FIG. 6, including the actuators 350 for realizing the degrees of freedom of the joints that are distributed in the whole body of the robot apparatus 201 as illustrated in FIG. 6, a distance sensor (not shown) for metering the distance between the robot apparatus 201 and an object, an attitude sensor 351 for observing the attitude and the inclination of the trunk unit 202, landing verification sensors 352, 353 for detecting the takeoff and the touchdown of the left and right soles, load sensors arranged on the soles 121 and a power source control device 354 for managing the power source that may typically be a battery, by way of the bus interface (I/F) 310. The attitude sensor 351 is typically formed by combining an acceleration sensor and a gyro sensor, whereas the landing verification sensors 352, 353 are formed by using proximity sensors, micro-switches or the like.

The thinking control module 200 and the movement control module 300 are built on a common platform and connected to each other by way of respective bus interfaces 210, 310.

The movement control module 300 controls the concerted movement of the whole body of the robot apparatus 201 that is produced by the actuators 350 in order to express the action instructed by the thinking control module 200 to take. More specifically, the CPU 311 takes out an action that corresponds to the behavior specified by the thinking control module 200 from the external memory device 314 or internally generates an action pattern. Then, the CPU 311 defines the movement of each of the feet, the ZMP trajectory, the movement of the trunk, that of each of the upper limbs, the horizontal position and the height of the waist and so on according to the specified action pattern and transfers the command values for realizing the action as indicated by the definitions to the respective actuators 350.

Additionally, the CPU 311 can adaptively control the concerted movement of the whole body of the robot apparatus 201 by detecting the attitude and the inclination of the trunk unit 202 of the robot apparatus 201 according to the output signal of the attitude sensor 351 and, at the same time, if each of the leg units 205R/L is in an idle state or in a standing state according to the output signal of the corresponding landing verification sensor 352 or 353. Still additionally, the CPU 311 controls the attitude and the movement of the robot apparatus 201 so as to make the ZMP position to be constantly directed toward the center of the ZMP stability region.

The movement control module 300 is adapted to feedback the extent to which the behavior of the robot apparatus is manifested according to the will decided by the thinking control module 200 and hence the status of the processing operation of itself to the thinking control module 200. In this way, the robot apparatus 201 can judge the situation of itself and its surroundings and behave autonomously according to the control program it stores.

Figure 9:
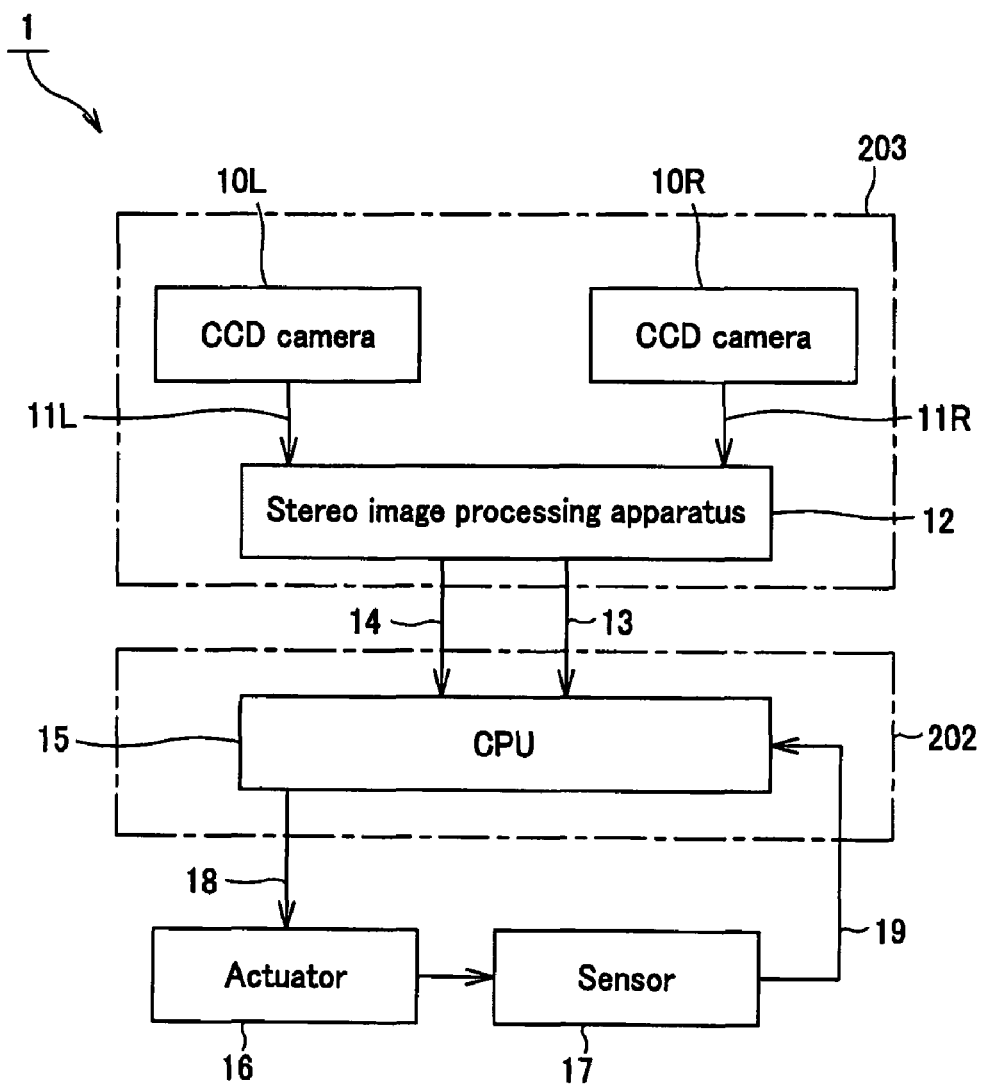
FIG. 9 is a schematic block diagram of the system for recognizing the surrounding environment of a robot apparatus as an environment map when the embodiment of environment map building apparatus of FIG. 3 is applied to the robot apparatus.

FIG. 9 is a schematic block diagram of the system for recognizing the surrounding environment of a robot apparatus as an environment map when the environment map building apparatus 1 of FIG. 3 is applied to the robot apparatus. Referring to FIG. 9, the robot apparatus 201 comprises actuators 16 and various sensors 17 in addition to the components illustrated in FIG. 3. In the robot apparatus 201, an image input apparatus 251 is used for the pair of CCD cameras 10R, 10L and the thinking control module 200 operates as stereo image processing apparatus 12. The stereo image processing apparatus 12 computationally determines the parallax information (distance information) of the images 11R, 11L and then calculates a color image 13 and a parallax image 14 alternately for the left and right CCD cameras in each frame.

The color image 12 and the parallax image 13 are input to the CPU (control section) 15 contained in the trunk unit 202 of the robot apparatus 1. Actuators 16 are arranged at each joint of the robot apparatus 1 and a control signal 18 that represents a command from the CPU 15 is supplied to each of the actuators to drive the motor of the actuator according to the command value of the control signal 18. Each joint (actuator) is equipped with a potentiometer and the rotary angle of the motor is transmitted to the CPU at each necessary time. The various sensors 17 including the potentiometers fitted to the respective actuators, the touch sensors fitted to the soles and the gyro sensor fitted to the trunk unit acquire information on the current state of the robot apparatus that may include the current angle of each joint, grounding information, attitude information and the like and output the acquired information to the CPU 15 as sensor data 19. Thus, the CPU 15 receives the color image 13 and the parallax image 14 coming from the stereo image processing apparatus 12 and the sensor data 19 on all the angles of the joints, or the actuators, as input and executes an environment-responding expression process by means of software.

The software of the robot apparatus 201 is designed on an object unit basis so as to execute various recognition processes for recognizing the current position, the quantity of movement, the obstacles in the surrounding environment and the environment map and output a string of actions to be ultimately taken by the robot apparatus. The robot apparatus uses two coordinate systems including a camera coordinate system in world coordinate system (to be also referred to as absolute coordinate system hereinafter) which is a coordinate system having its origin at a specific object such as a landmark, which will be described hereinafter, and a robot-centered coordinate system (to be also referred to as relative coordinate system) having its origin in the robot apparatus itself.

Figure 10:
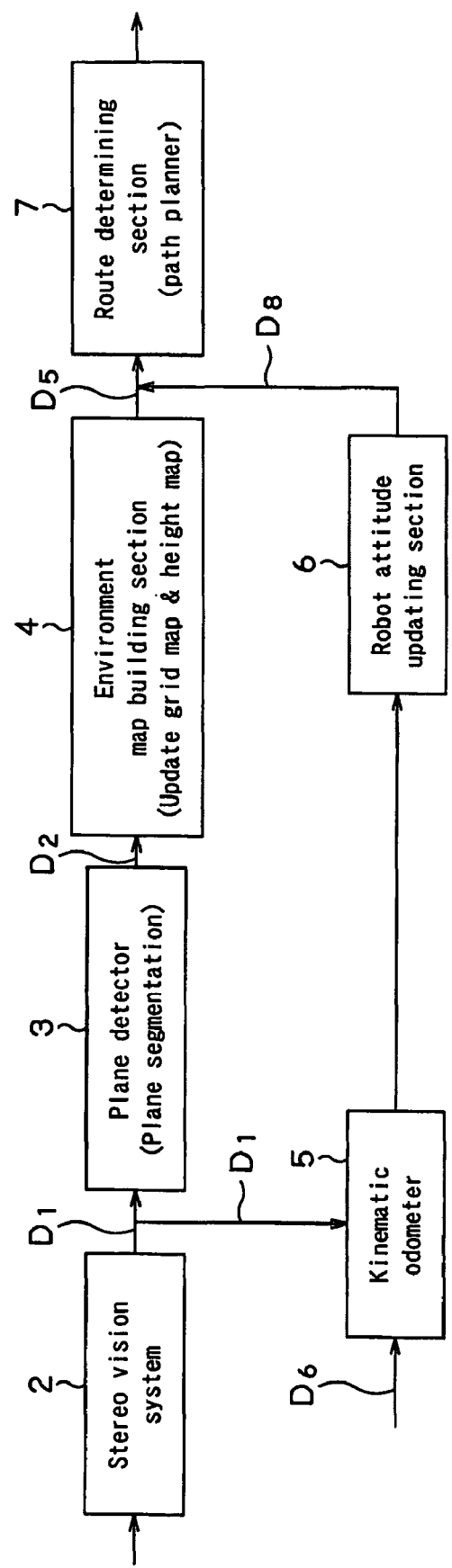
FIG. 10 is a schematic functional block diagram of the system of the embodiment of robot apparatus of FIG. 6 for executing a process down to expressing the environment as an environment map on the basis of the stereo data acquired by an image input apparatus 251 and determining the moving route on the basis of the environment map.

FIG. 10 is a schematic functional block diagram of the system of the embodiment of robot apparatus 201 of FIG. 6 for executing a process down to expressing the environment as an environment map on the basis of the stereo data acquired by the image input apparatus 251 and determining the moving route on the basis of the environment map. Referring to FIG. 10, the robot apparatus 201 comprises a kinematic odometry 5 for receiving the stereo data D1 including parallax information and a parallax image and the sensor data D6 as input, determining the joint angles from the sensor data 6 at the time when the stereo data D1 is picked up and transmitting joint angle data D7, a robot attitude (pose) updating section 6 for converting the robot-centered coordinate system into the camera coordinate system on the basis of the joint angle data D7 from the kinematic odometry 5 and transmitting robot attitude data D8 and a route determining section (path planner) 7 for controlling action commands for determining the moving route or the like of the robot apparatus 201 on the basis of the environment map data D5 from the environment map building section 4 and the robot attitude data from the robot attitude updating section 7 in addition to the stereovision system 2, the plane detector 3 and the environment map building section 4.

The robot apparatus 201 firstly observes the surrounding environment by means of the stereovision system 2 and outputs stereo data D1 as three-dimensional distance information that is computationally obtained on the basis of the parallax between the two eyes. More specifically, it compares the images input from the left and right cameras that correspond to the two eyes of human being for each pixel and its vicinity and estimates the distance to an object from the parallax images. Then, it outputs three-dimensional distance information as image (distance information). The robot apparatus 201 can recognize a plurality of planes existing in the surrounding environment by detecting them by means of the plane detector 3 from the distance image. Additionally, the environment map building section 4 builds an environment map of the surroundings of the robot apparatus. The route determining section 7 realizes the moving action of the robot apparatus in the environment by means of the environment map data D5 and the robot attitude data D8. Thus, the robot apparatus 201 can recognize the intra-visual-field information on the staircase, the obstacles and the steps found in its own visual field as environment map by applying the environment map building apparatus 1 to the robot apparatus 201 and grasp the surrounding environment including the obstacles, the staircase and steps by referring to the environment map. Then, as a result of the recognition, the robot apparatus can take actions that may typically include an action of stepping up a staircase, a walking action and an action of searching a moving route by using the environment map.

Figure 11:
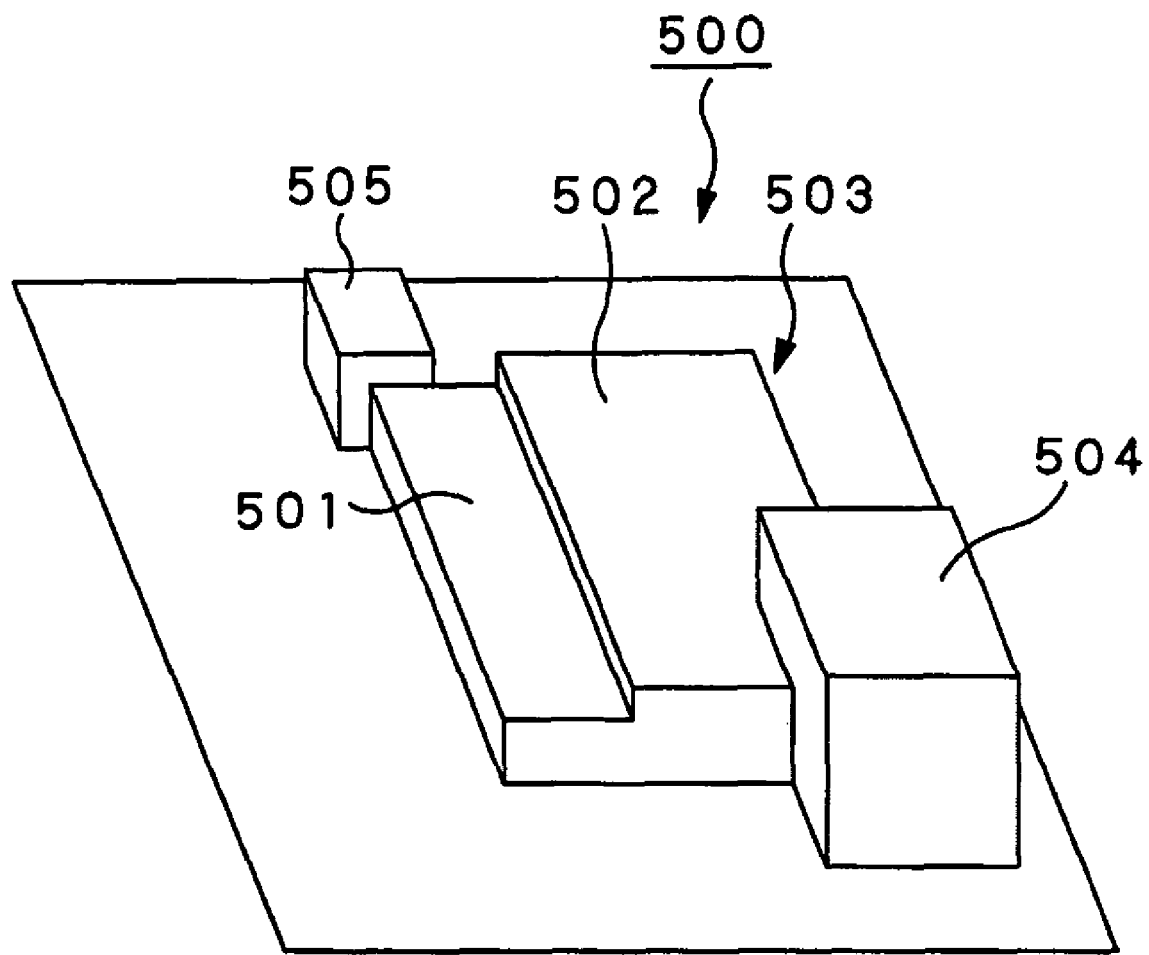
FIG. 11 is a schematic illustration of a real space recognized by the robot apparatus equipped with the environment map building apparatus of FIG. 3.

FIG. 11 is a schematic illustration of a real space recognized by the robot apparatus 201 that is equipped with the environment map building apparatus 1. The real space S500 of FIG. 11 contains a staircase ST503 including planes PL501 and PL502 that the robot apparatus 201 can step up and obstacles OB504 and OB505 that are not surmountable to the robot apparatus.

Figure 12:
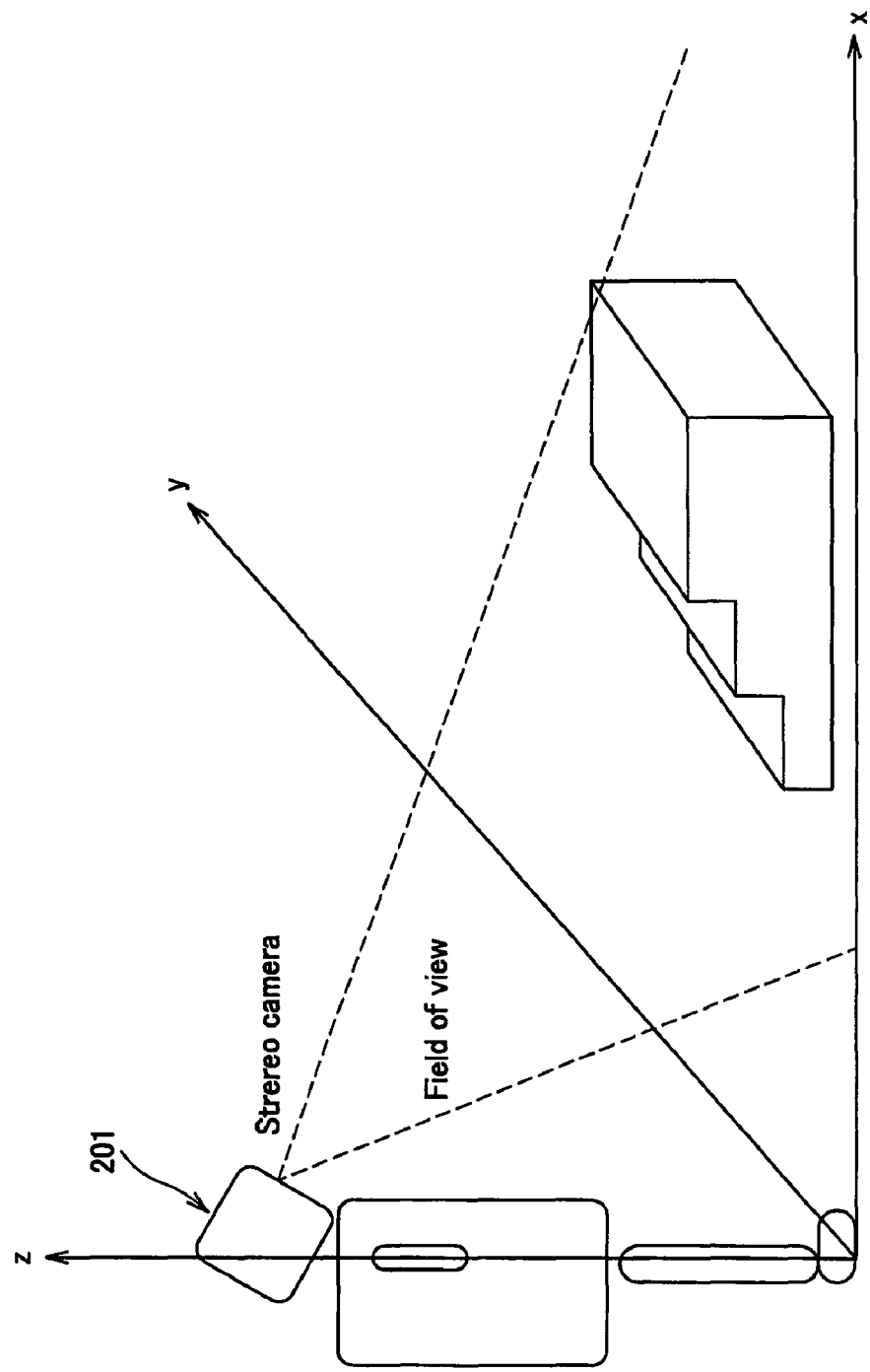
FIG. 12 is a schematic illustration of an operation of imaging the surrounding environment of the embodiment of robot apparatus of FIG. 6.

FIG. 12 is a schematic illustration of an operation of imaging the surrounding environment of the robot apparatus 201. The floor surface (base plane) is referred to as x-y plane while the height direction is referred to as z-axis as shown in FIG. 12. Then, the visual field of the robot apparatus 201 having an image input section (stereo cameras) in the head unit 203 is confined to a predetermined range located in front of the robot apparatus 201 as shown in FIG. 12. The robot apparatus 201 recognizes the environment in the visual field and builds an environment map for it.

Subsequently, the process in which the robot apparatus 201 recognizes the real space S500 of FIG. 11 and builds an environment map will be described by referring to the related drawings along with the configuration of the environment map building apparatus 1.

The stereovision system 2 acquires three-dimensional distance data and image data such as color image data and parallax images that are obtained by means of the stereo cameras and transmits the acquired distance information (stereo data D1) to the plane detector 3.

The plane detector 3 detects a plurality of planes existing in the environment from the distance information (stereo data D1) output from the distance meter of the stereovision system and outputs plane data D2. The technique for detecting planes may be selected from known plane detecting techniques such as the line segment extension method and the Hough transformation method. To detect a plurality of planes like a staircase from the distance data including noises, the line segment extension method may typically be used to accurately detect planes.

It is possible to reliably detect not only the dominant plane or planes in the visual field but also a plurality of planes such as those of a staircase by means of the line segment extension method. More specifically, it is possible to obtain robust results of plane detection relative to observation noises at the time of segment extraction for the purpose of extracting planes in a plane detecting operation by adaptively fitting line segments according to the distribution of points in distance data with the line segment extension method.

Figure 13:
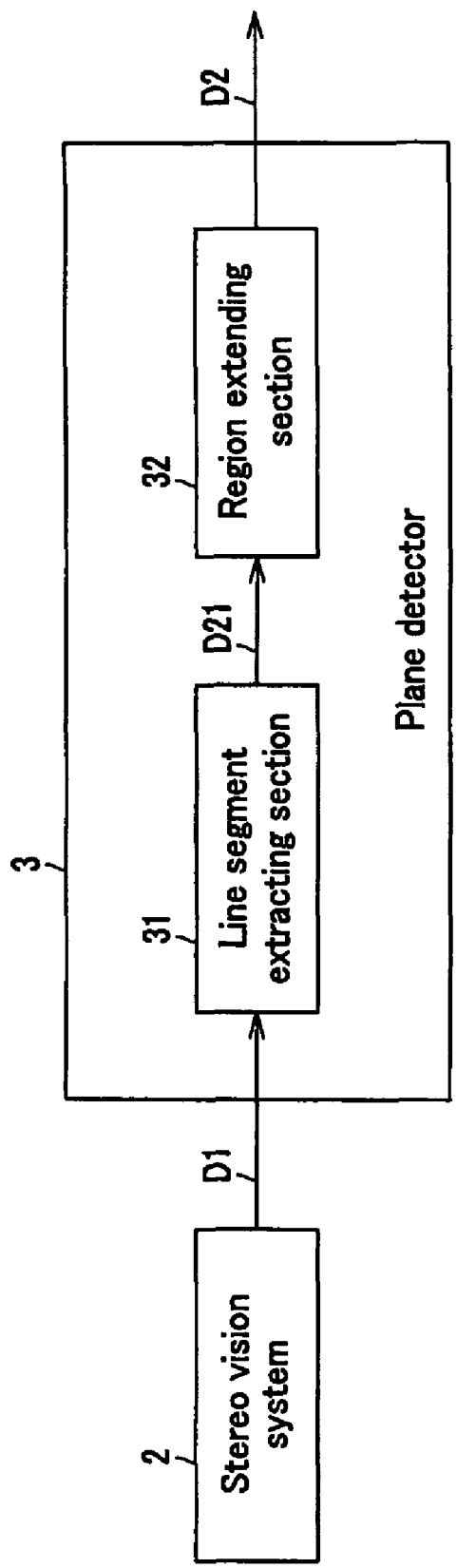
FIG. 13 is a schematic functional block diagram of a plane detecting apparatus of the embodiment.

As shown in FIG. 13, the plane detector 3 includes a line segment extracting section 31 for selecting groups of distance data points, the distance data points of each group being estimated to be on the same plane, out of the distance data points of an image and extracting a line segment for each group of distance data points and a region extending section 32 for extracting one or more than one plane regions existing in the image from the groups of all the line segments extracted by the line segment extracting section 31. The region extending section 32 arbitrarily selects three line segments that are estimated to be on the same plane from the groups of line segments and determines a base plane from them. Then, it judges if the each of the line segments located adjacent to the selected three line segments belongs to the plane same as the base plane and, if the line segment is judged to be belonging to the same plane, it updates the base plane and at the same time extends the region of the base plane by the line segment that operates as region extending line segment.

The line segment extracting section 31 extracts a group of distance data points that are estimated to be on the same plane in a three-dimensional space out of the data string of each column or each row in the distance image and generates one or more than one line segments from the group of distance data points depending on the distribution of the distance data points of the group. In other words, if it is judged that the distribution is uneven, it is determined that the distance data points of the group are not found on the same plane and the distance data points are divided into groups. Then, the operation of judging if the distribution of the distance data points of each of the groups produced by the division is even or uneven is repeated. A line segment is generated from each group of the distance data points whose distribution is judged to be uniform. The above operation is repeated for all the data strings and the generated group of line segments D21 is output to the region extending section 32.

The region extending section 32 selects three line segments that are estimated to be on the same plane out of the group of line segments D21 and determines a plane that can be a seed of a base plane from the planes that are defined by three line segments. Then, the region extending section 32 divides the distance image into a plurality of planes by means of the technique of extending a region by sequentially uniting the lines belonging to the plane identical with the region of the plane that can be a seed of a base plane (seed region) and outputs the plane data D2 on the groups of the planes.

The plane detecting section 3 is adapted to detect planes by the line segment extension method because this method is adapted to detect planes from an acquired image if it contains a plurality of planes such as those of a staircase unlike the Hough transformation method that is adapted to detect a dominant plane contained in an acquired image. At this time, line segments are generated depending on the distribution of distance data points to make it possible to acquire robust results of plane detection relative to measurement noises.

Figure 14:
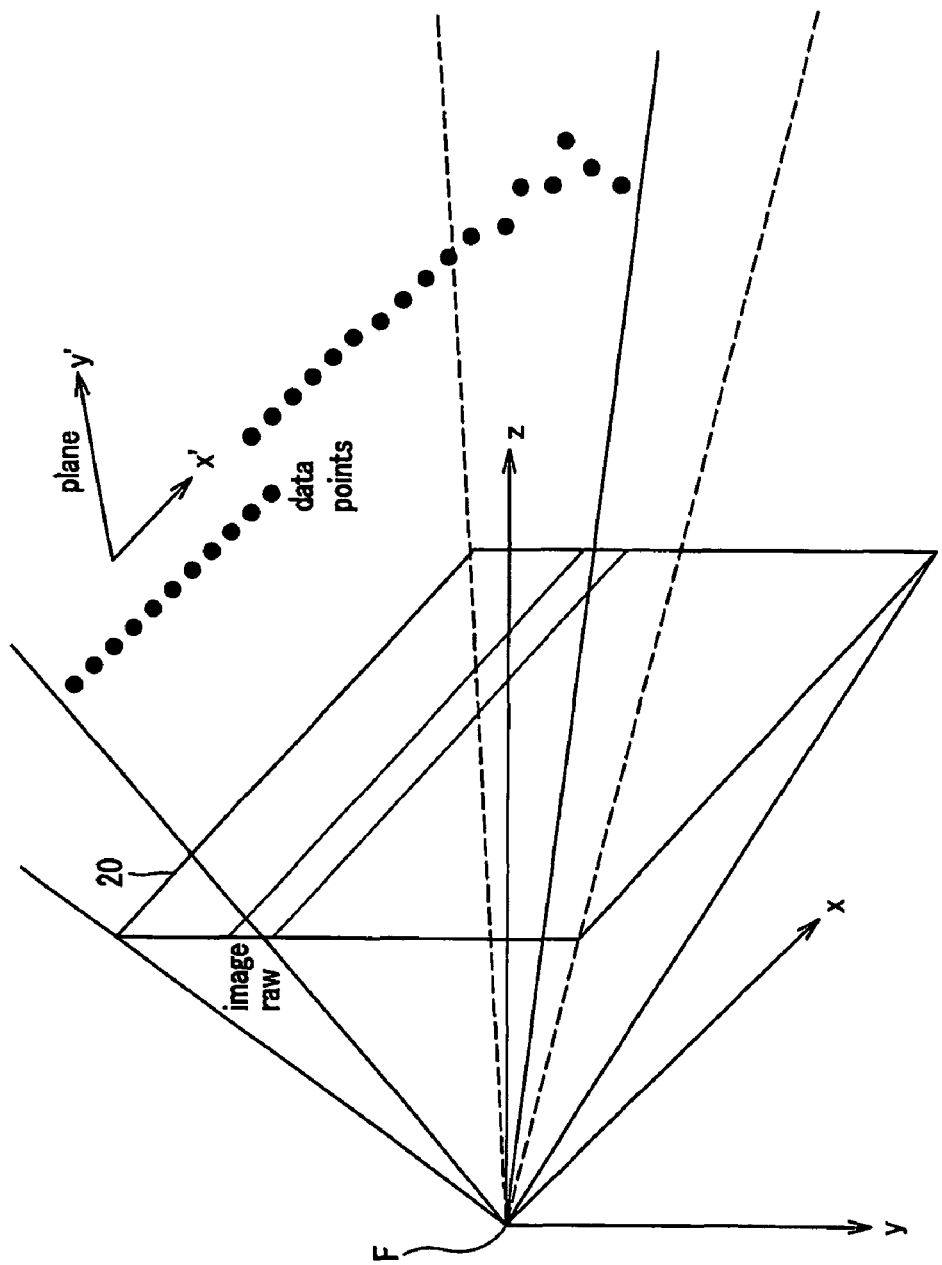
FIG. 14 is a schematic illustration of the plane detecting process that employs the line segment extension method in the embodiment.

FIG. 14 is a schematic illustration of a plane detecting process using the line segment extension method. When detecting planes by the line segment extension method, the data string in the row direction or in the column direction is processed for image 20 picked up from focal point F. More specifically, line segments are generated from the distance data points that are estimated to be belonging to the same plane by utilizing the fact that a straight line is formed when a group of distance data points belongs to the same plane in a pixel string in the row direction of an image (image row), for example. Then, a plane is estimated and detected on the basis of a group of line segments that form the same plane out of the obtained groups of line segments.

Figure 15:
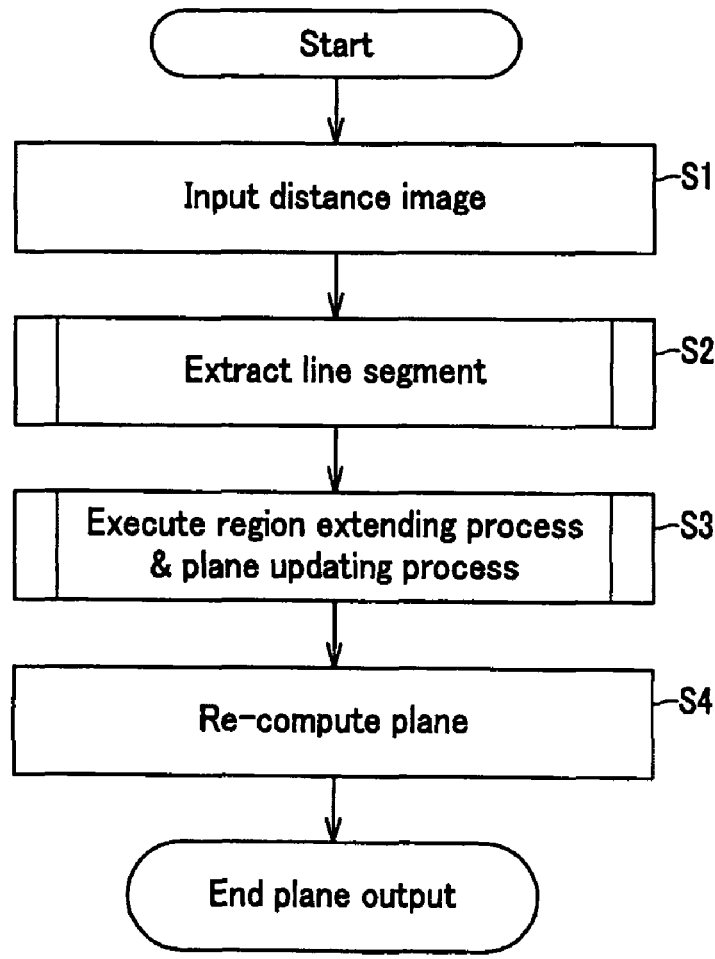
FIG. 15 is a flow chart of the plane detecting process, using the line segment extension method.

FIG. 15 is a flow chart of the plane detecting process, using the line segment extension method. Firstly, a distance image is input (Step S1) and line segments are determined from the data points that are estimated to be belonging to the same plane in each pixel string in the row direction (or the column direction) of the distance image (Step S2). Then, the line segments that are estimated to be belonging to the same plane are extracted from the group of line segments and the plane that is formed by the line segments is determined (Step S3). In Step S3, firstly regions that can be a seed of a plane (to be referred to as seed region hereinafter) are selected and then the most likely seed region is selected. In this selection step, three line segments including a line extending in the row direction out of vertically adjacent lines (or in the column direction out of horizontally adjacent lines) are required to be in the same plane. Then, the plane to which the seed region formed by the selected three line segments belongs is used as base plane and the plane that is determined from the three line segments by averaging is determined in advance. The region defined by the three line segment is referred to as base plane region.

Then, it is judged if the straight line formed by the pixel string in the row direction (or the column direction) adjacent to the selected seed region belongs to the base plane or not by comparing a spatial distance. If the straight line belongs to the base plane, it is added to the base plane region (region extending process) and the base plane is updated so as to include the added line segment (plane updating process). The above processes are repeated until there is no longer any line segment existing on the same plane among the data strings adjacent to the plane region. Then, the above operation of detecting seed regions and executing the plane updating process and the region extending process is repeated until there is no longer any region (of three line segments) that can be a seed. Finally, the regions that form the same plane are selected from the obtained plurality of regions and linked together. In this embodiment, Step S4 is additionally provided for a plane re-determining process where the line segment or line segments that deviate from the obtained plane by more than a predetermined threshold value are excluded from the group of line segments that are assumed to be belonging to the obtained plane to determine a final plane, which will be described hereinafter.

Note that the process of detecting line segments from the three-dimensional distance data and each region where the line segments are grouped for the same plane is same as the known plane detecting process using the line segment extension method. However, this embodiment differs from conventional method in terms of the line segment extracting method that is employed in Step S2. As pointed out above, a problem such as over segmentation or under segmentation can arise if line segments are generated from groups of distance data points to make them fit the latter unless the threshold value is modified depending on the accuracy, or the level of refinement, of the distance data points. In view of this problem, a technique of analyzing the distribution of distance data and adaptively modifying the threshold value depending on the accuracy of distance data and noises is introduced into this embodiment for the operation of extracting line segments.

Figure 16A:
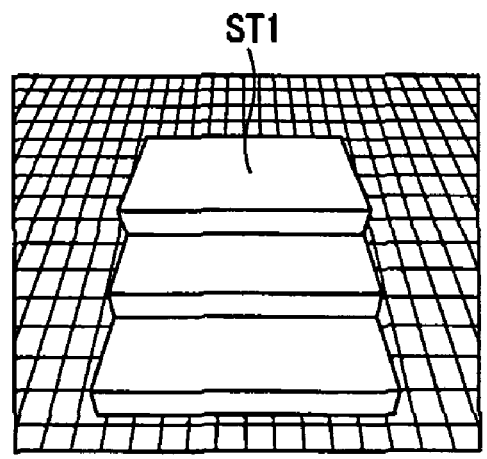
Figure 16B:
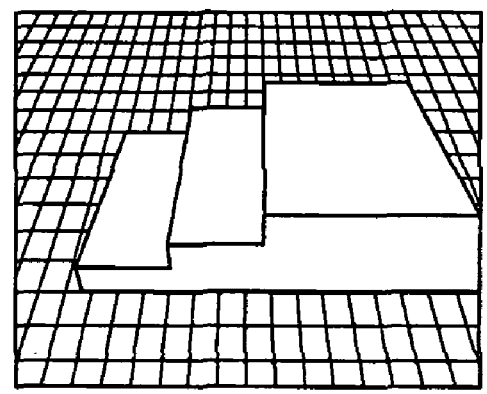
Figure 16C:
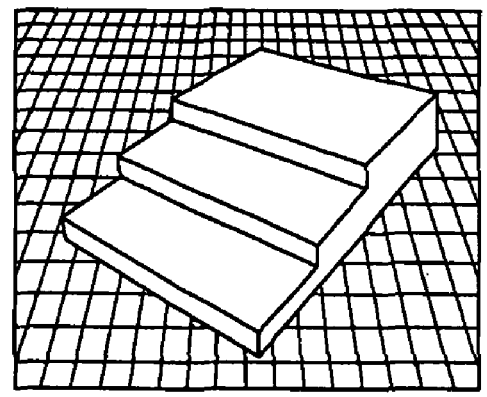
Figure 17A:
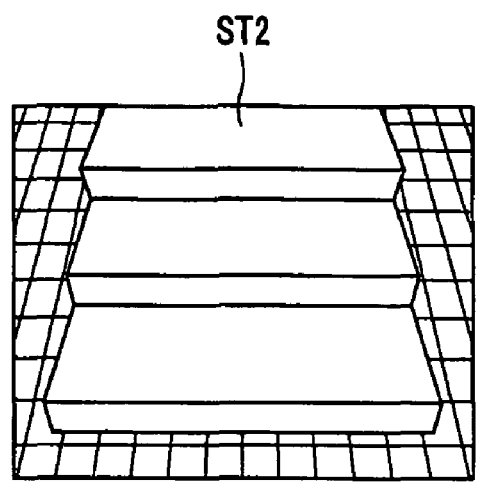
Figure 17B:
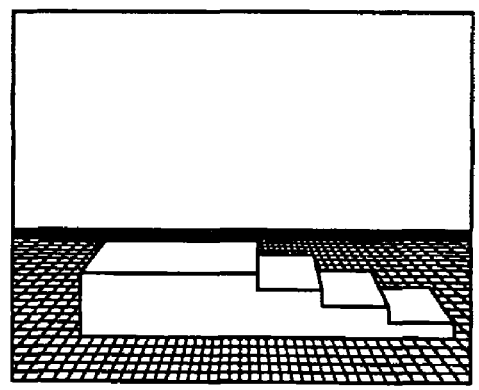
Figure 17C:
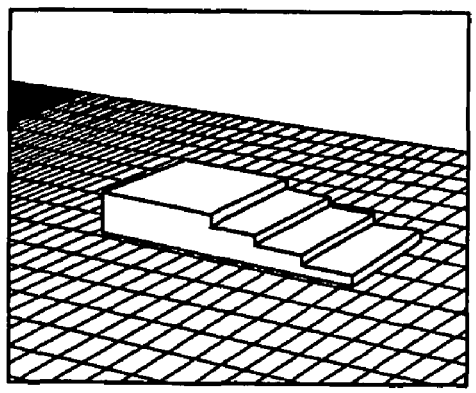

Now, the planes detected by the above-described plane detecting process will be described by referring to FIGS. 16A through 17C. Assume here that the planes detected by the plane detector 3 are those of staircases ST1 and ST2 as shown in FIGS. 16A through 17C. FIG. 16A and 17A are schematic frontal perspective views of the respective staircases. FIG. 16B and FIG. 17B are schematic lateral perspective views of the respective staircases. FIG. 16C and FIG. 17C are schematic oblique perspective views of the respective staircases.

In this letter of specification, each surface of a staircase that people and robot apparatus use for going up or down along the staircase (a surface where a foot or a movable leg section is placed) is referred to as tread and the height from a tread to the next tread (the height of a step) is referred to as riser. The steps of a staircase are denoted as the first step, the second step and so on from the lowest step.

The staircase ST1 illustrated in FIGS. 16A through 16C has three steps and the riser is 4 cm high, while the tread of the first step and that of the second step are 30 cm wide and 10 cm long and the tread of the third step, or the uppermost step, is 30 cm wide and 21 cm long. On the other hand, the staircase ST2 illustrated in FIGS. 17A through 17C has three steps and the riser is 3 cm high, while the tread of the first step and that of the second step are 33 cm wide and 12 cm long and the tread of the third step, or the uppermost step, is 33 cm wide and 32 cm long.

Figure 18A:
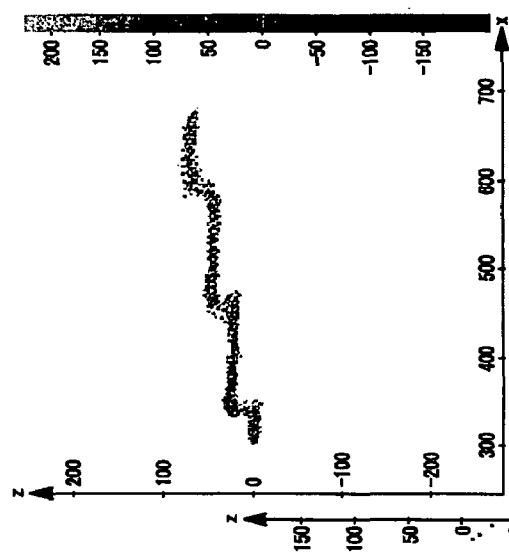
FIG. 18A is an image of the schematic frontal perspective view of the staircase of FIG. 17A as taken by a stereovision system.
Figure 18B:
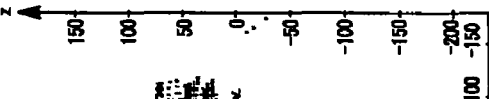
FIGS. 18B through 18D are schematic illustrations of the three-dimensional distance data acquired from the image of FIG. 18A.
Figure 18C:
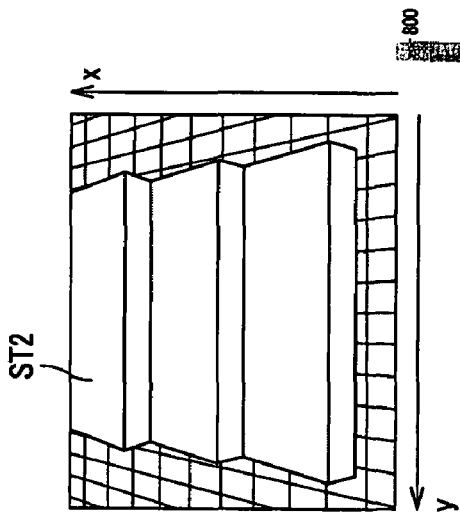
Figure 19A:
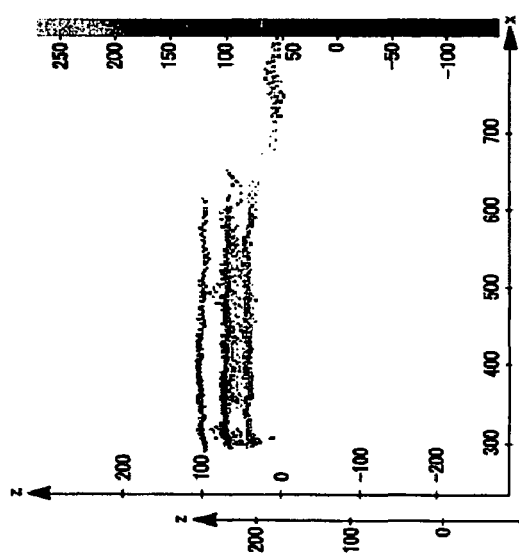
FIG. 19A is an image of the schematic lateral perspective view of the staircase of FIG. 17B as taken by a stereovision system and FIGS. 19B through 19D are schematic illustrations of the three-dimensional distance data acquired from the image of FIG. 19A.
Figure 19B:
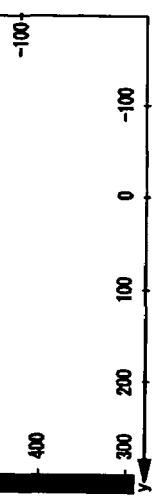
Figure 19C:
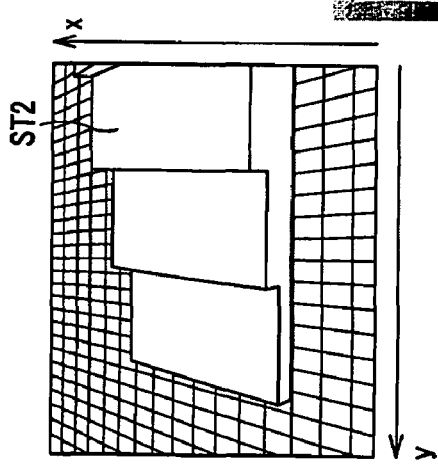
Figure 19D:
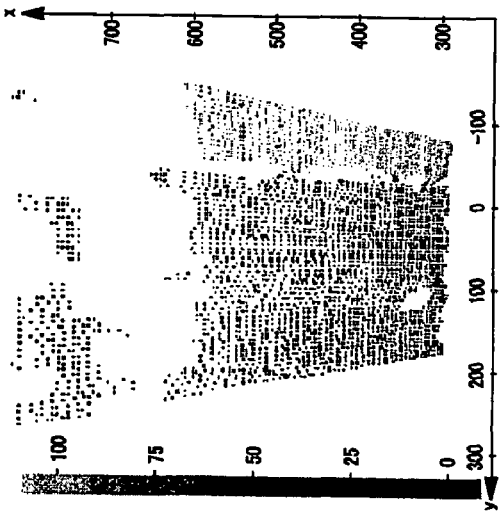
Figure 20A:
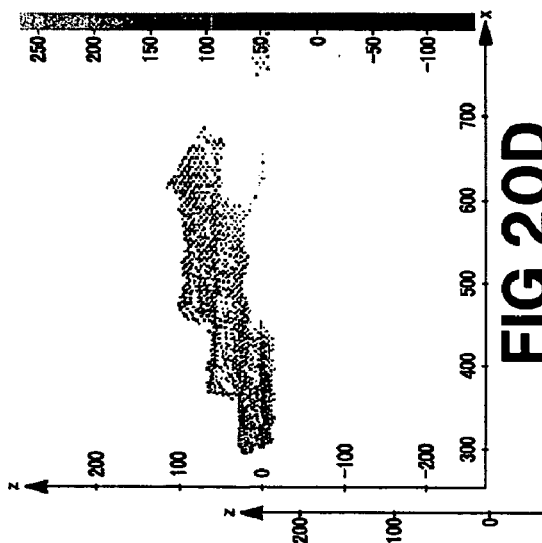
FIG. 20A is an image of the schematic oblique perspective view of the staircase of FIG. 17C as taken by a stereovision system and FIGS. 20B through 20D are schematic illustrations of the three-dimensional distance data acquired from the image of FIG. 20A.
Figure 20B:
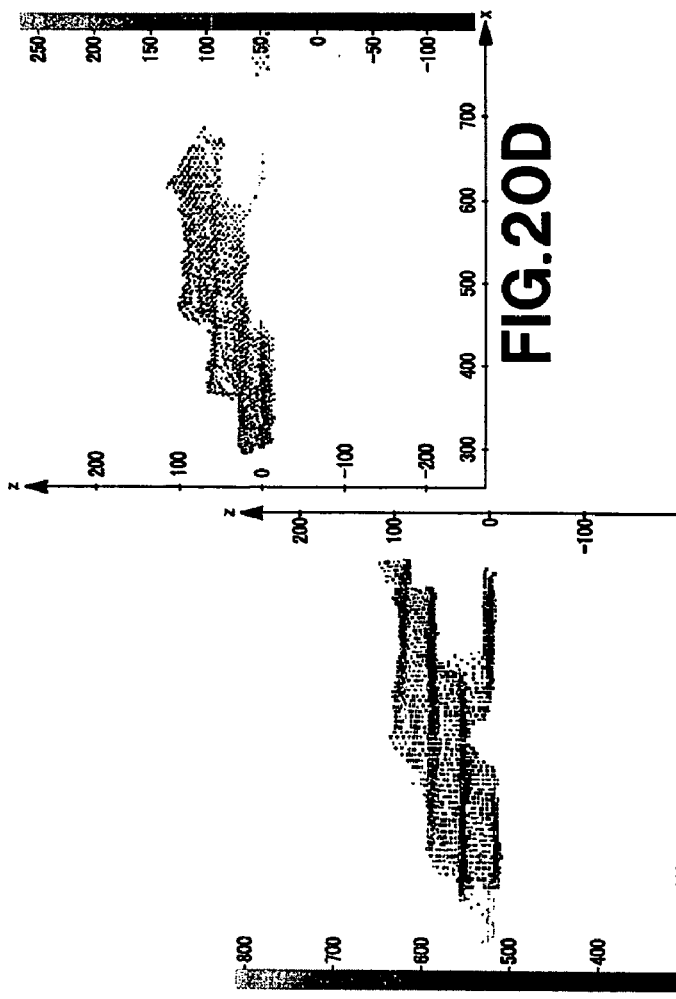
Figure 20C:
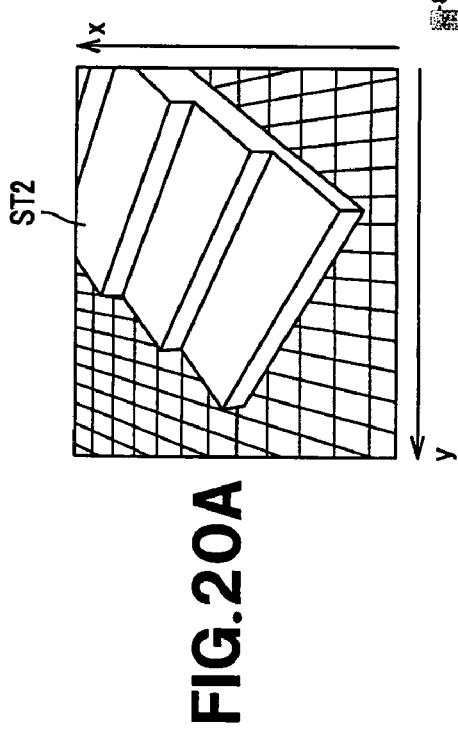
Figure 20D:
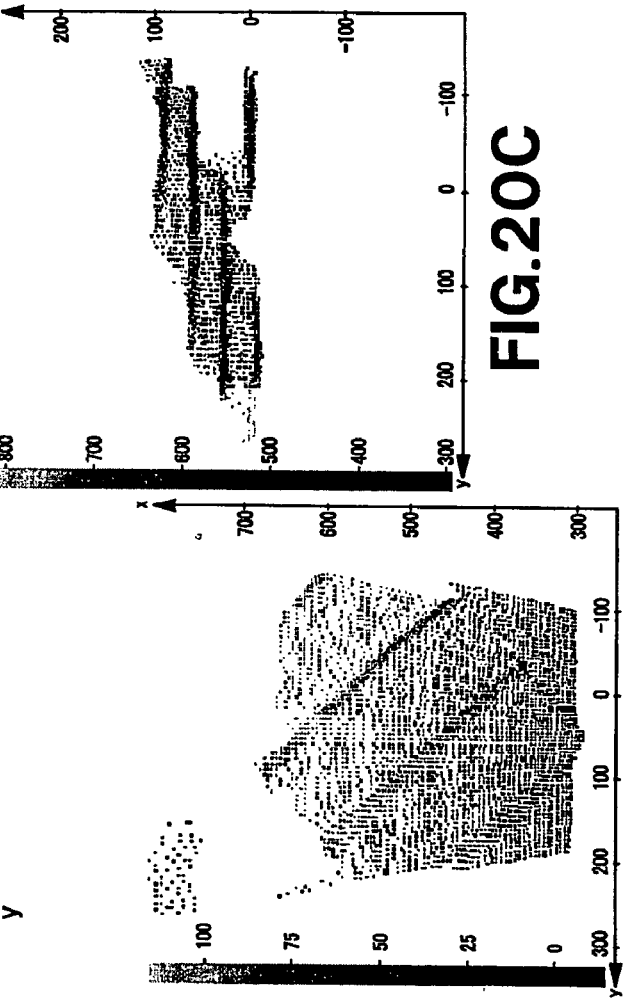

FIGS. 18A, 19A and 20A are respectively an image of the schematic frontal perspective view, that of the schematic lateral view and that of the oblique perspective view of the staircase ST2 of FIGS. 17A through 17C as taken by a stereovision system. FIGS. 18B, 18C, 19B, 19C, 20B and 20C are schematic illustrations of the three-dimensional distance data acquired from the image of FIGS. 18A, 19A and 20A.

Figure 18D:
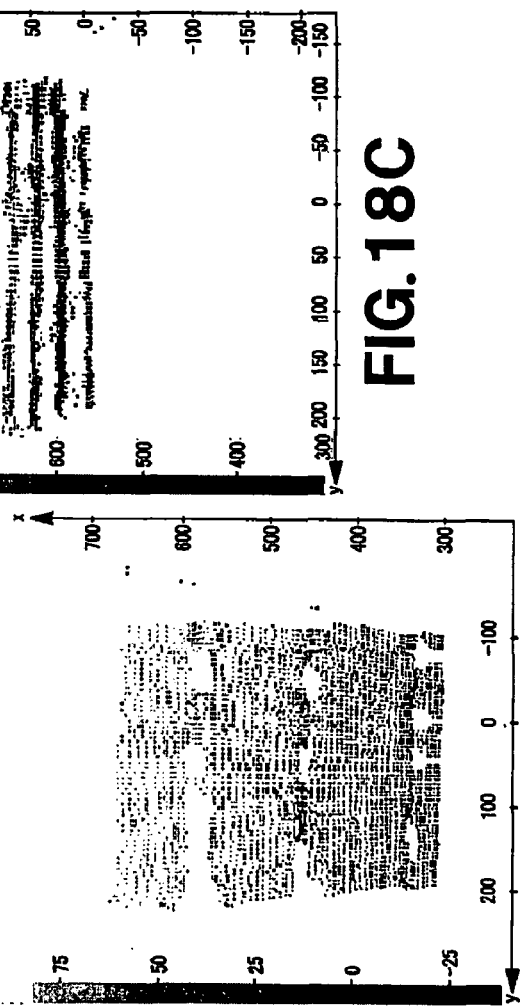

The three-dimensional distance data as illustrated in FIGS. 18B and 18C are obtained when the staircase ST2 is shot from the front side thereof shown in FIG. 18A. In FIG. 18B, the horizontal axis represents the y-direction and the vertical axis represents the x-direction. The grounding surface of the robot apparatus 201 is 0 and the height of the staircase is expressed by gradation, the higher the paler in the direction of the z-axis (height direction). Thus, data points showing the same level of gradation are located at the same level. As shown in FIG. 18B, the data points of the region corresponding to the tread of the second step are paler than those of the region corresponding to the tread of the first step and the data points of the region corresponding to the third step are paler than those of the region corresponding to the tread of the second step. The substantially trapezoidal region where distance data are shown represents the range that the robot apparatus can shoot by its stereovision system (view field range). In FIG. 18B, the distance data points are substantially divided into four categories, the darkest area corresponding to the region with the smallest value in the z-direction representing the floor surface. In FIG. 18C, the horizontal axis represents the y-direction and the vertical axis represents the z-direction, while the distance in the x-direction is expressed by gradation. In FIG. 18, the greater the distance in the x-direction the paler the gradation. In FIG. 18D, the horizontal axis represents the x-direction and the vertical axis represents the z-direction, while distance in the y-direction is expressed by gradation.

The three-dimensional distance data as illustrated in FIGS. 19B and 19C are obtained when the staircase ST2 is shot by the stereovision system of the robot apparatus 201 from a lateral side thereof shown in FIG. 19A. The data points found in the uppermost region having a large value of the x-axis shows a level of gradation similar to the one in the region where the height is 0 to indicate that the floor behind staircase ST2 is observed. The three-dimensional distance data as illustrated in FIGS. 19B and 19C are obtained when the staircase ST2 is shot by the stereovision system of the robot apparatus 201 from an oblique direction in FIG. 20A. It will be seen that the four regions including the floor surface and the treads of the first through third steps are expressed by gradation so as to be discriminated clearly.

The surface of the staircase ST2 is required to bear a pattern (texture) in order for the robot apparatus to acquire such three-dimensional distance data by means of stereo cameras. In other words, any object bearing no pattern cannot be recognized by computations and the robot apparatus cannot accurately meter the distance between the object and the robot apparatus because it is not possible to recognize the object by means of the parallax between the two images picked up by two cameras. In other words, the accuracy of measurement in acquiring distance data by means of a stereovision system depends on the texture of the object of observation. The term "parallax" as used herein refers to the difference between the image of a spot in space mapped by the left eye (camera) and the image mapped by the right eye (camera). Thus, the parallax varies as a function of the distance from each of the cameras.

Figure 21:
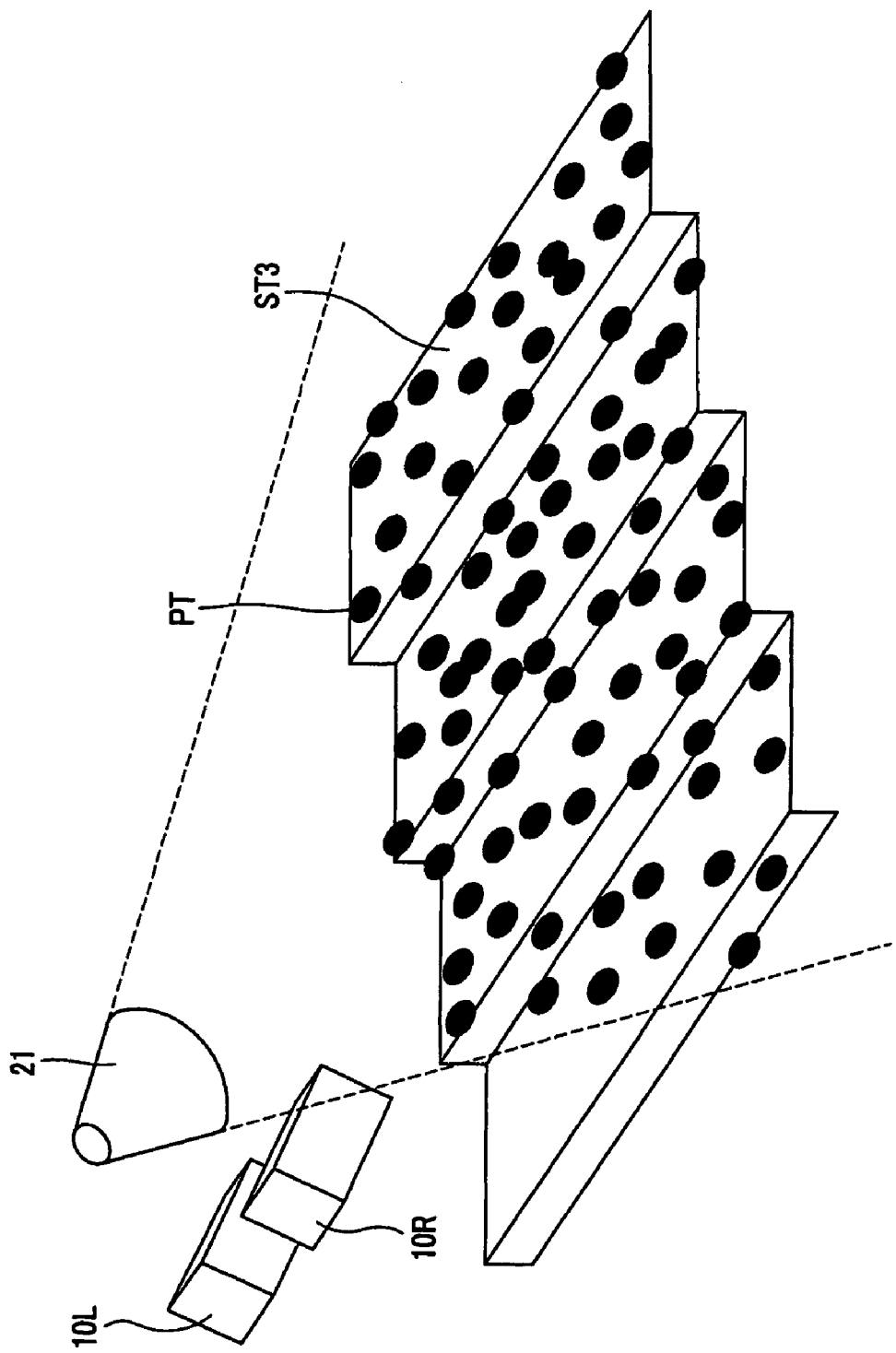
FIG. 21 is a schematic illustration of a robot apparatus equipped with a means for applying a texture to an object.

Therefore, as shown in FIG. 21, the robot apparatus is typically provided in the head unit with a light source 21 for outputting infrared rays as a projection means. The light source 21 projects (irradiates) infrared rays onto staircase ST3 and other objects have no or little texture such as walls and operates as a pattern applying means for applying a random pattern PT to the object. Note, however, that the pattern applying means for applying a random pattern PT is not limited to a light source for projecting infrared rays so long as it can form a random pattern PT and acquire a distance image. For example, the robot apparatus itself may alternatively draw a pattern on the object, although infrared rays provide an advantage that a pattern of infrared rays can be observed by the CCD cameras mounted in the robot apparatus, while it is not visible to human eyes.

The three-dimensional grid updating section 41 of the environment map building section 4 receives the stereo data D1 that is the three-dimensional information acquired by the stereovision system 2 and the plane data D2 that is the outcome of the detection of the plane by means of the plane detector 3 relative to the three-dimensional information and builds a three-dimensional grid. Additionally, it executes the following process for all the unit grids (to be referred to as cells hereinafter) p (x, y, z) in the real space S500 that is expressed by a three-dimensional grid.

Figure 22:
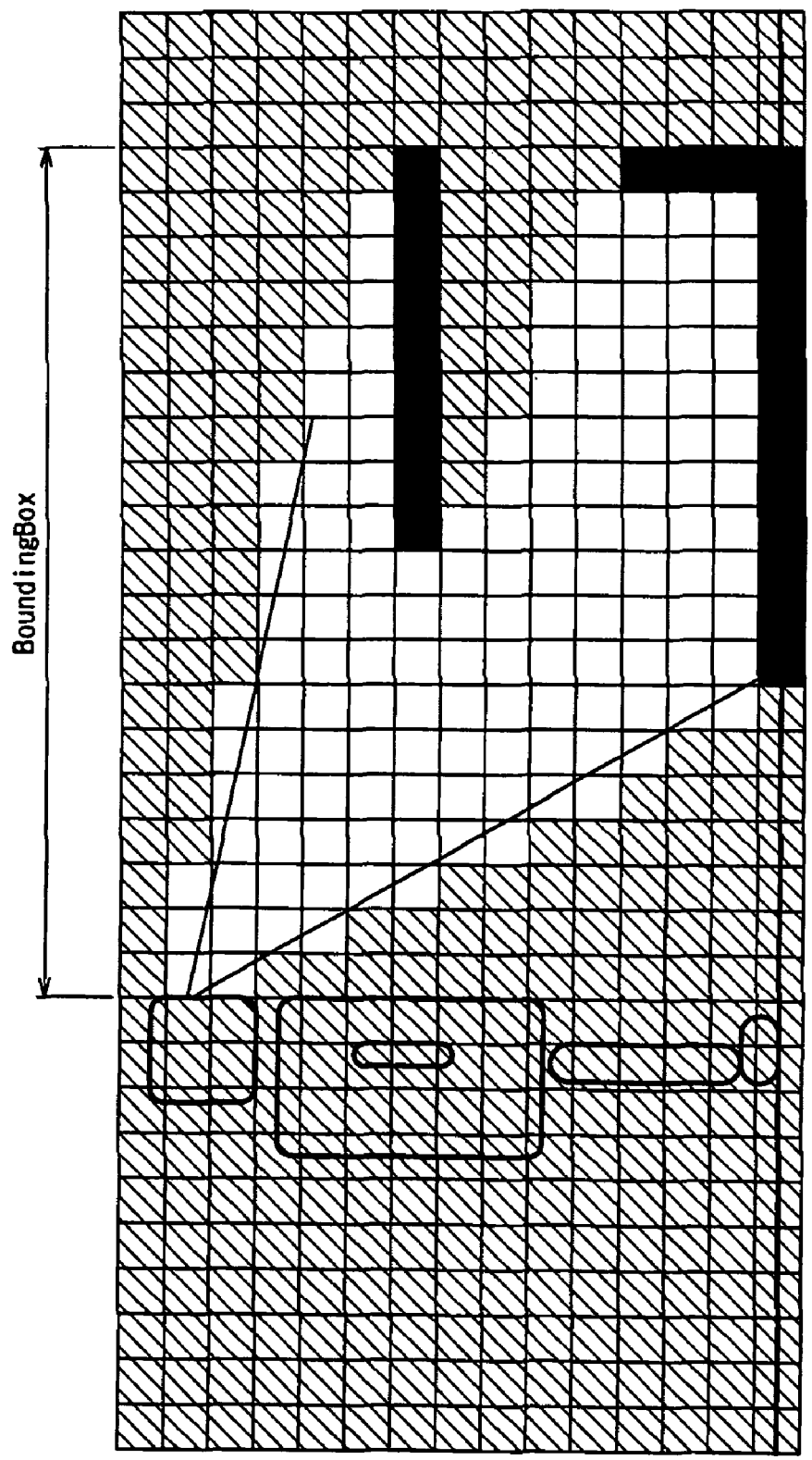
FIG. 22 is a schematic illustration of an operation of updating a three-dimensional grid according to the outcome of an observation as viewed in the direction of the y-axis, showing a lateral view of the robot apparatus.

The three-dimensional grid updating section 41 builds and/or updates the three-dimensional grid on the basis of the algorithm that no obstacle exists on the line connecting the points of measurements and the center of observation (the middle point of the stereo cameras). FIG. 22 is a schematic illustration of an operation of updating a three-dimensional grid according to the outcome of an observation as viewed in the direction of the y-axis, showing a lateral view of the robot apparatus. In FIG. 22, the shaded cells that are not found in the visual field (field of view) of the robot apparatus 201 are cells that are not measured yet, whereas the black cells are cells measured by the robot apparatus 201 and the white cells are cells located between the robot apparatus 201 and the points of measurement. Thus, the hatched region is an unconfirmed region.

On the basis of the above algorithm, an empty process is executed on the cells located between cell p, which is the object point of measurement, and the stereo cameras 11L, 11R of the robot apparatus. Subsequently, an occupied process is executed on the cell that corresponds to the point of measurement p. The three-dimensional grid holds an obstacle existence probability (probability of being occupied by an obstacle) p(c) relative to the cells C. The empty process and the occupied process are statistic processes that are executed on these cells. The empty process is a process of reducing the obstacle existence probability, whereas the occupied process is a process of raising the obstacle existence probability. In this embodiment, the Bayes' updating rule is adopted for the technique of computing the existence probability for the empty process and the occupied process.

Formulas (1) and (2) shown below are used respectively to reduce the existence probability by the empty process and to raise the existence probability by the occupied process. The formula (1) expresses the probability of being "occupied" for a cell C having an obstacle existence probability of p(c). In the formulas (1) and (2), p(occ| . . . ) and p(empty| . . . ) are respectively a predetermined threshold value th for the probability by which the cell C is occupied and a predetermined threshold value th for the probability by which the cell C is not occupied respectively.

$$p(c) \leftarrow p(c \mid empty) = \frac{p(empty \mid c)p(c)}{p(empty \mid c)p(c) + p(empty \mid \neg c)p(\neg c)} \quad \text{[formula 1]}$$

$$p(c) \leftarrow p(c \mid occ) = \frac{p(occ \mid c)p(c)}{p(occ \mid c)p(c) + p(occ \mid \neg c)p(\neg c)} \quad \text{[formula 2]}$$

Figure 23:
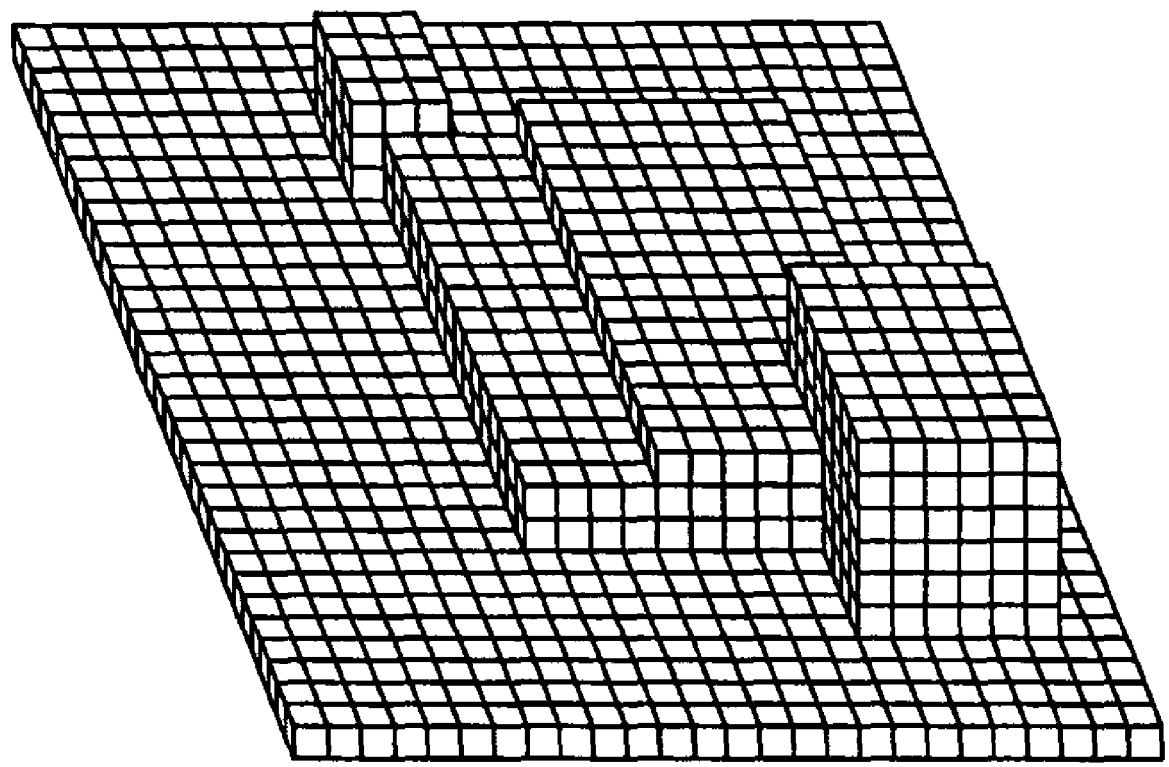
FIG. 23 is a schematic illustration of a three-dimensional grid showing a region same as that of the real space of FIG. 11.

FIG. 23 is a schematic illustration of a three-dimensional grid to each of whose cells an obstacle existence probability is given. The three-dimensional grid is formed by cells, each having a horizontal resolution of four centimeters and a vertical resolution of one centimeter. For the purpose of convenience, it shows a region same as that of the real space S500 of FIG. 11. However, in reality, the robot apparatus 201 acquires information on the surrounding environment at predetermined regular time intervals such as thirty times per second so that, when the robot apparatus 201 is moving, the real space S500 that is expressed by the three-dimensional grid changes incessantly. Of the acquired cells, each of those that are viewed is expressed by 1, whereas each of those that are not viewed is expressed by 0.5. The occupancy probability will be gradually updated as the operation of acquiring information on the surrounding environment is conducted thirty times per second.

The height map verifying section 42 of the environment map building apparatus 1 builds a 2.5-D height map formed by applying height information to the cells of the 2.5-D height map as analog information and verifies the 2.5-D height map, using the occupancy probability data (obstacle existence probability data) of each of the cells obtained from the three-dimensional grid.

Figure 1:
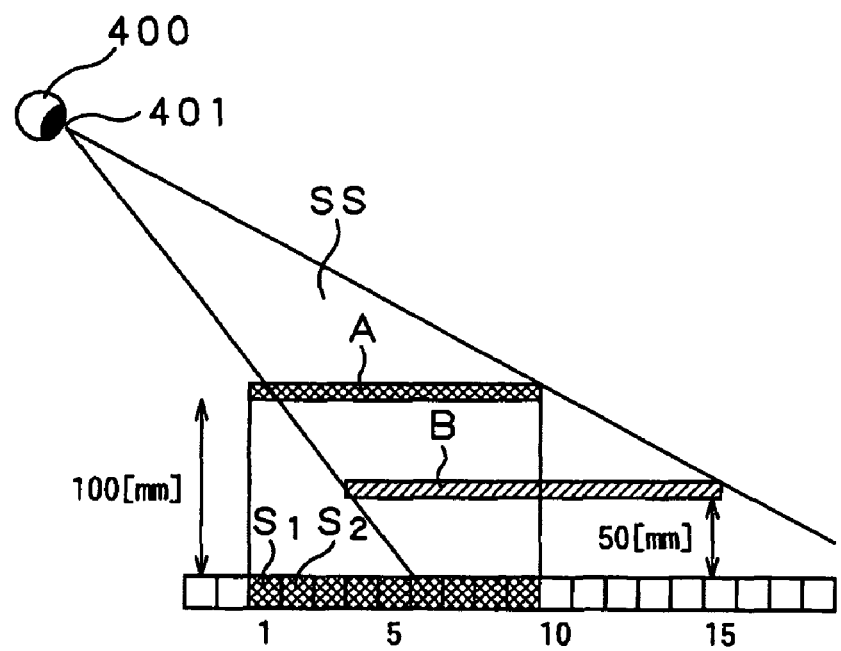
FIG. 1 is a schematic illustration of the problem of a known environment recognition process using a 2.5-D height map.
Figure 2:
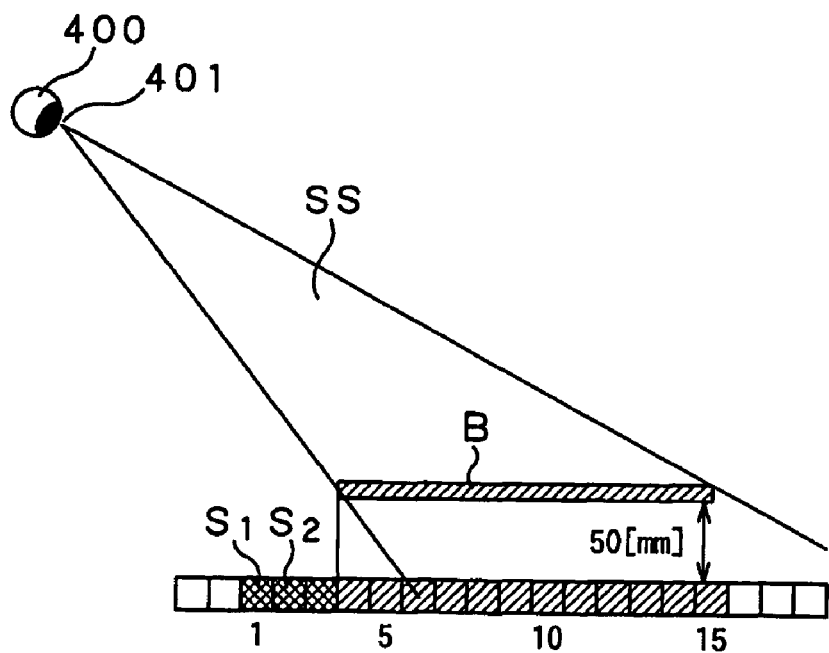
FIG. 2 is another schematic illustration of the problem of a known environment recognition process using a 2.5-D height map.

As described earlier by referring to FIGS. 1 and 2, the conventional technique of recognizing the environment by a 2.5-D height map gives rise to a problem that the obstacle occupancy probability is not updated when the plane that was observed last time has disappeared or when an obstacle has moved into the visual field from the outside of the visual field. However, this embodiment dissolves the problem as the height map verifying section 42 verifies the 2.5-D height map by means of a three-dimensional grid. A three-dimensional grid is built and updated on the basis of an algorithm that no obstacle exist on the straight line that geometrically connects a point of measurement and the center of observation (the middle point of the stereo cameras). The height map verifying section 42 executes a process of updating the occupancy probability when the height information of the 2.5-D height map is made to correspond to the cells of the three-dimensional grid by referring to the occupancy probability of each cell of the three-dimensional grid.

Figure 24:
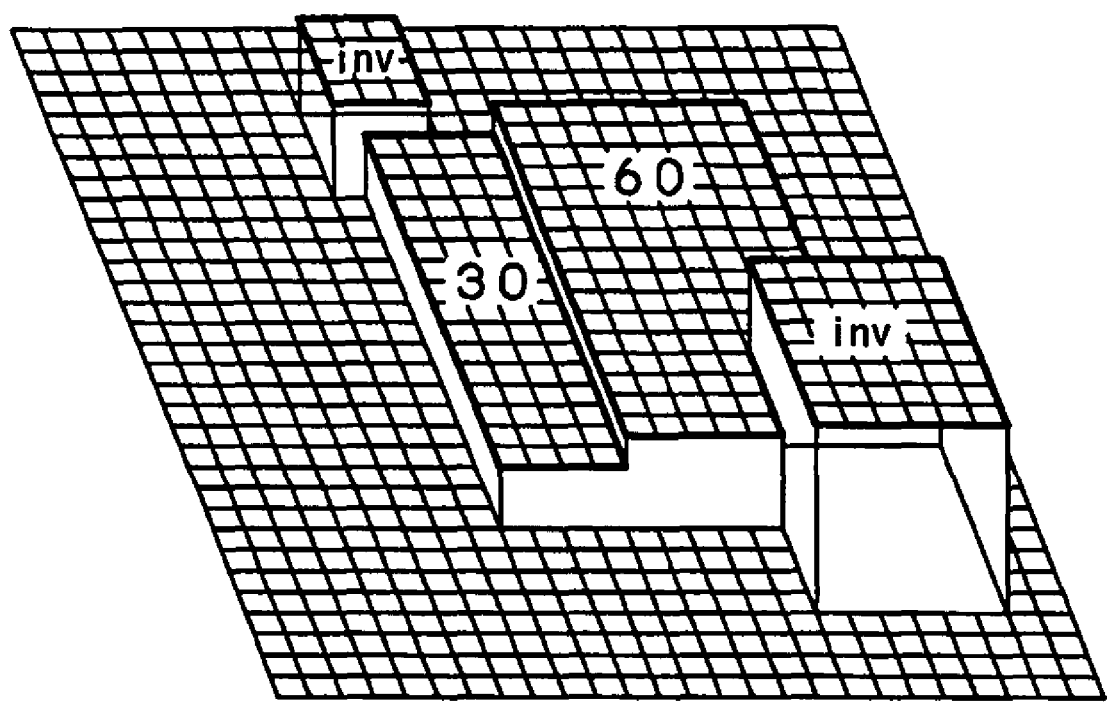
FIG. 24 is a schematic illustration of a 2.5-D height map.

Now, the verification process of the height map verifying section 42 will be described below. FIG. 24 is a schematic illustration of a 2.5-D height map. A 2.5-D height map holds height information h and an invalid flag for each cell of the corresponding two-dimensional grid that is expressed by rectangular grids. In FIG. 24, height h=30 is given to the cells that correspond to the plane PL501 in FIG. 11 and height h=60 is given to the cells that correspond to the plane PL502 in FIG. 11. When each cell has height information that tells that the robot apparatus 201 cannot step on it, an invalid flag (inv) is given to it.

Like three-dimensional grid, a 2.5-D height map is expressed by means of a two-dimensional grid of 4 meters square comprising cells having a horizontal resolution of 4 centimeters. No vertical resolution is considered for a 2.5-D height map and height information is assigned to each cell. An invalid flag corresponds to an obstacle for a robot apparatus 201. However, an unrealistic value for expressing a space such as −10,000 may be given instead of an invalid flag so as to show an obstacle to the robot apparatus 201.

Figure 25:
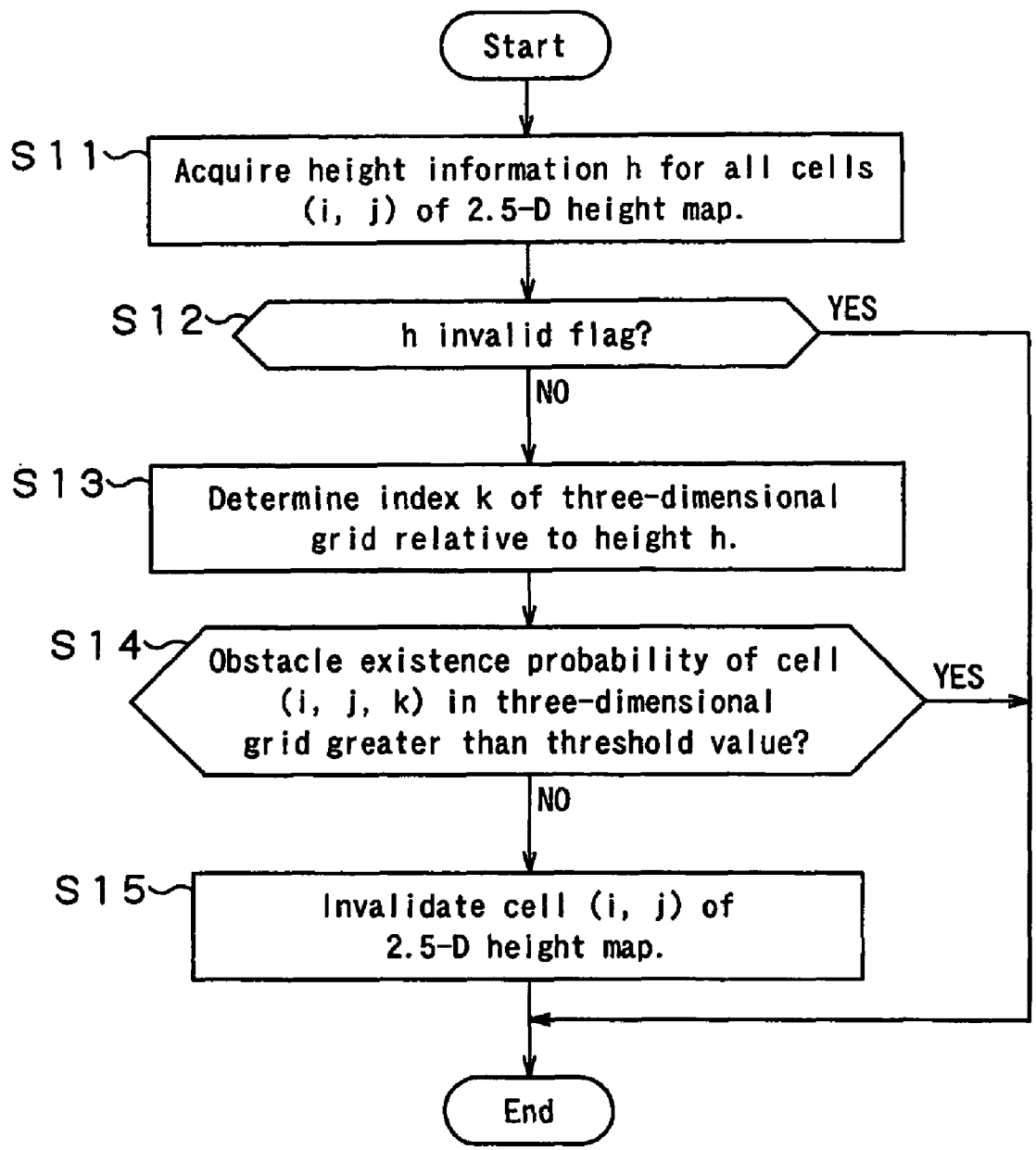
FIG. 25 is a flow chart of a process for verifying a 2.5-D height map by the height map verifying section.

FIG. 25 is a flow chart of a process for verifying a 2.5-D height map by the height map verifying section 42. The height map verifying section 42 acquires height information from the 2.5-D height map that is a height map relative to the base plane and makes it correspond to the height coordinates of the corresponding three-dimensional grid. Then, it compares the occupancy probability of each cell of the corresponding three-dimensional grid with the threshold value for determining if the cell represents an obstacle to be recognized or not. It judges that the cell does not represent an obstacle when the occupancy probability is smaller than the threshold value, whereas it judges that the cell represents an obstacle when the occupancy probability is greater than the threshold value so as to update the height information of the height map relative to the base plane.

The height map verifying section 42 acquires the height of the grid for all the cells (i, j) in the 2.5-D height map, referring to the 2.5-D height map (Step S11). If the height information h shows an invalid flag, it terminates the process (Step S12; yes).

If, on the other hand, the height information h proves to be valid and hence the height information h is applicable to all the cells, it determines index k for the three-dimensional grid by making the height information h properly correspond to the three-dimensional grid (Step S13). Subsequently, it compares the obstacle existence probability p (Cijk) of each of the cells (i, j, k) in the three-dimensional grid that corresponds to the 2.5-D height map with a threshold value th for determining if the cell represents an obstacle to be recognized or not (Step S14).

The height map verifying section 42 judges that the cell does not represent an obstacle when the obstacle existence probability is smaller than the threshold value (Step S14; no). At this time, the downstream height map updating section 43 updates the cells (i, j) of the 2.5-D height map on the basis of the algorithm for building a three-dimensional grid. To the contrary, the height map verifying section 42 judges that the cell represents an obstacle when the obstacle existence probability is greater than the threshold value (Step S14; yes) and terminates the process. In other words, it does not update the height information h of the 2.5-D height map.

The volume of computations can be reduced by applying the above-described process only to the cell region that corresponds to the visual field in the grid. In FIG. 22, the cell region that corresponds to the visual field is denoted as bounding box.

The height map updating section 43 updates the 2.5-D height map on the basis of the plane data D2 obtained by the plane detector 3 and the obstacle probability data D3 of the three-dimensional grid. The height map updating section 43 updates the 2.5-D height map when the plane to which the point of measurement p belongs is a horizontal plane and the obstacle existence probability of the cell of the three-dimensional grid that corresponds to the point of measurement p is greater the threshold value th for all the points of measurement (cells) p included in the space to be measured in the visual field of the robot apparatus 201.

Figure 26:
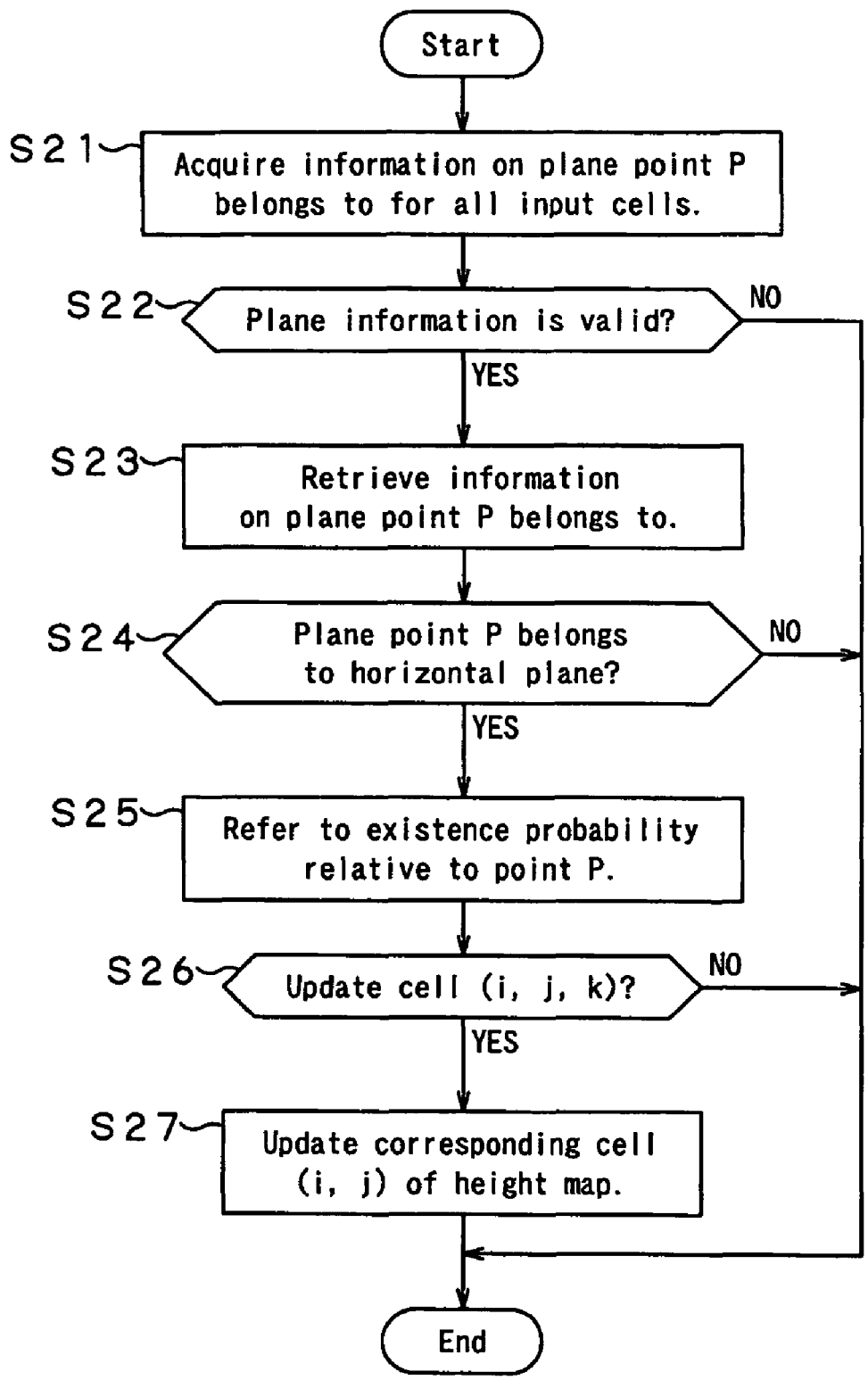
FIG. 26 is a flow chart of a process for updating a height map by the height map updating section.

FIG. 26 is a flow chart of a process for updating a 2.5-D height map by the height map updating section 43. Firstly, the height map updating section 43 acquires plane information on the planes to which all the point of measurement (cells) p located in the visual field belong (Step S21). The plane information is the plane data D2 that is the outcome of the plane detecting operation of the plane detector 3. More specifically, it acquires the plane ID (p_id) showing the plane to which a point of measurement p belongs and if the p_id is valid (Step S22; yes), it retrieves plane information on the plane to which the point of measurement p belongs out of the detected group of planes, using the p_id as key (Step S23).

Then, the height map updating section 43 checks if the plane to which the point of measurement p belongs is a horizontal plane or not and, if the plane is not a horizontal plane (Step S24; no), it terminates the process. If, on the other hand, the plane is a horizontal plane (Step S24; yes), it refers to the obstacle existence probability of the cell in the three-dimensional grid that corresponds to the point of measurement p (Step S25). More specifically, it determines the index (i, j, k) of the cell as positional information of the three-dimensional grid from the positional information (x, y, z) of the point of measurement p in the 2.5-D height map and refers to the cell of the three-dimensional grid according to the index. In this embodiment, not the actually measured height of the point of measurement p but the height of the plane to which the point of measurement p belongs (averaged height; plane.m_z) is used as height information h in order to reduce the influence of the noise at each point of measurement, although the height of the point of measurement p may be used alternatively.

Subsequently, the height map updating section 43 determines if the height information h for the point of measurement p has to be updated or not (Step S26). If the occupancy probability of the cell of the three-dimensional grid that corresponds to the point of measurement p is greater than the threshold value th and indicates the existence of an obstacle (Step S26; yes), it updates the corresponding cell (i, j) of 2.5-D height map with the height information h (Step S27).

There are several updating rules that can be applied to the cells (i, j) of the 2.5-D height map. They include overwriting/updating and holding the measured largest value. With the rule of overwriting/updating, the height of the cell (i, j) is always overwritten by the acquired h. With the rule of holding the measured largest value, on the other hand, the new value h is used for updating only when the height of the cell (i, j) is lower than the height indicated by the past height information h or when an invalid flag is put to the cell (i, j). The average of the height indicated by the past height information h and the new value may be used as another rule.

Figure 27:
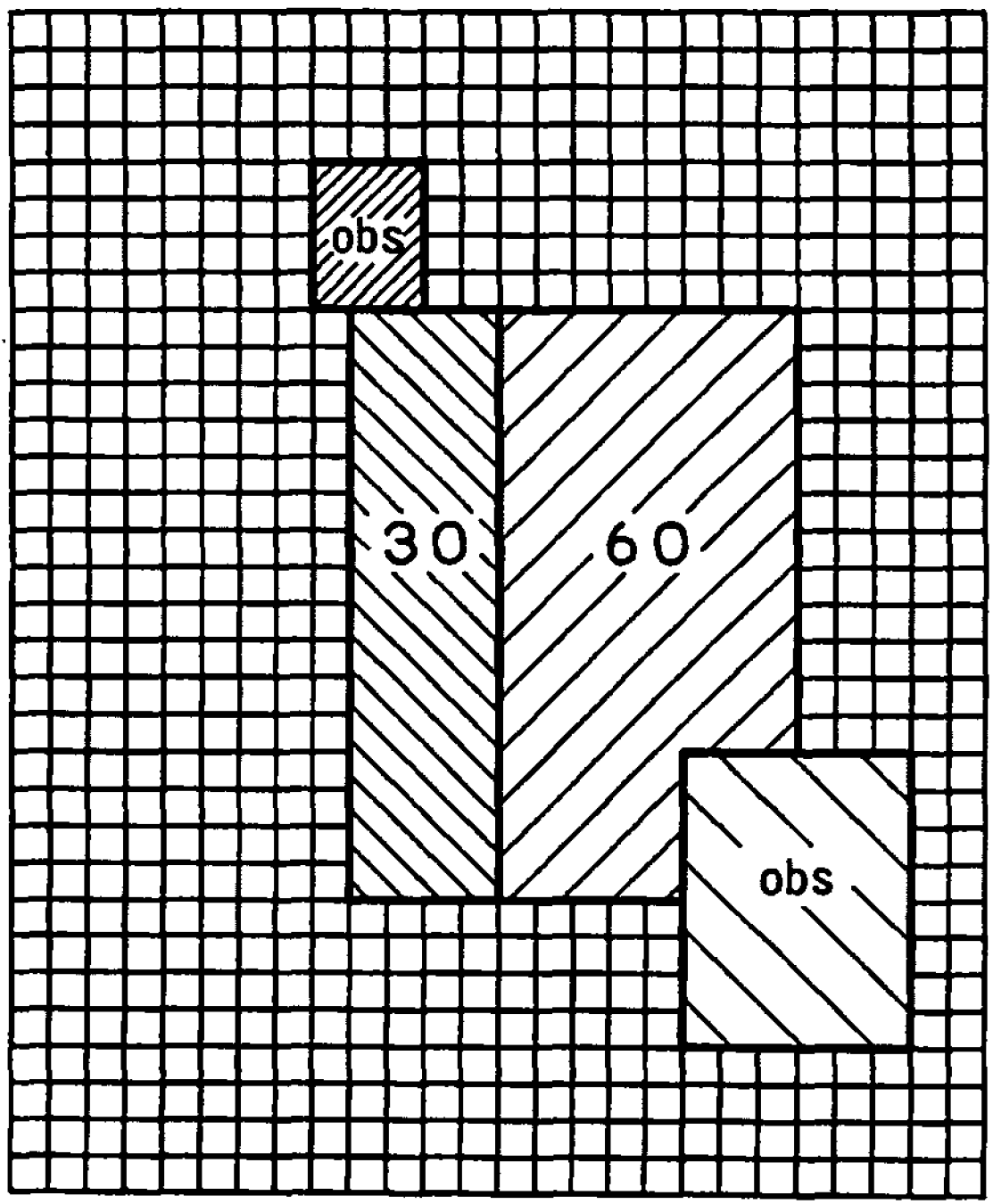
FIG. 27 is a schematic illustration of an environment map built by the environment map building section of FIG. 5.

FIG. 27 is a schematic illustration of an environment map built by way of the above-described sequence of processes. As pointed out above, it is possible to dissolve the problem described earlier by referring to FIGS. 1 and 2 by complementing the 2.5D-height map by the corresponding three-dimensional grid. In the environment map, height information h or the probability of existing an obstacle (obs) or not is applied to each cell in the two-dimensional grid.

Now, the expression of the environment only by the 2.5-D height map and the expression of the same environment by the 2.5-D height map complemented by the corresponding three-dimensional grid built by the robot apparatus 201 by means of the above described environment map building method will be compared for the case where a plane once recognized by the robot apparatus 201 has disappeared and for the case where a plane once recognized by the robot apparatus 201 has been moved.

1. When a Plane has Disappeared

Figure 28:
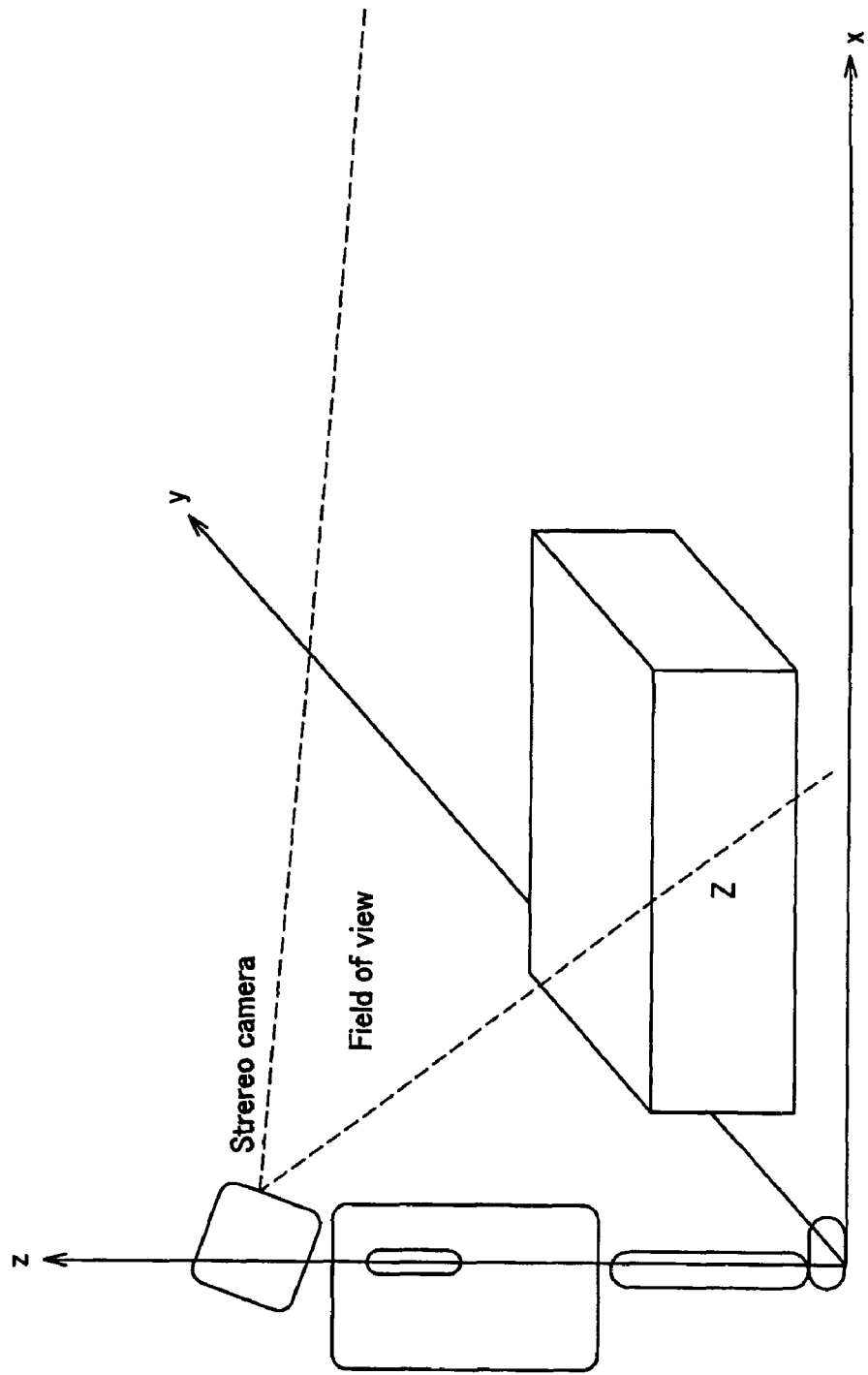
FIG. 28 is a schematic illustration of a state where a robot apparatus finds a box Z in the visual field of the robot apparatus and recognizes it.
Figure 29:
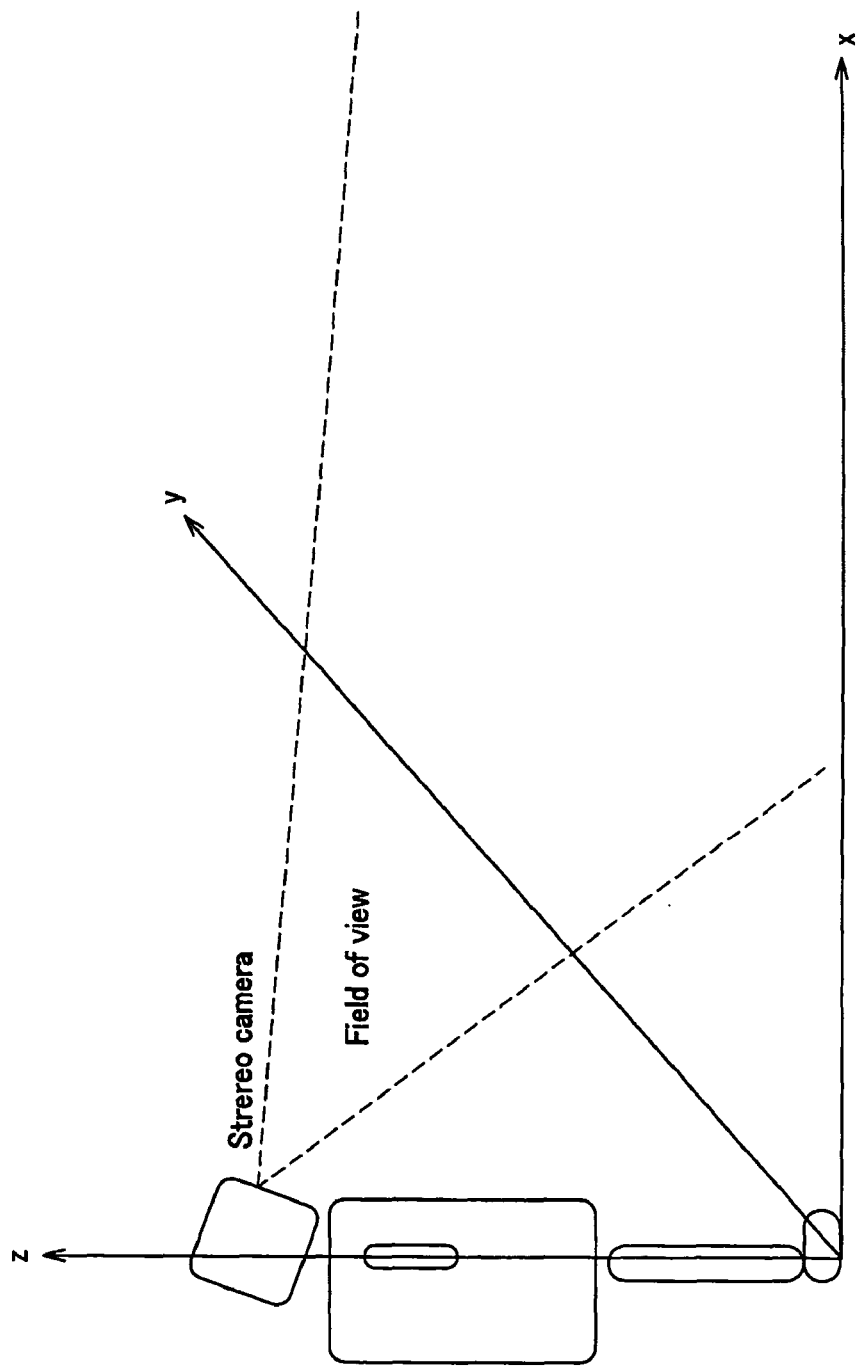
FIG. 29 is a schematic illustration of a state where the box Z of FIG. 28 is missing.
Figure 30:
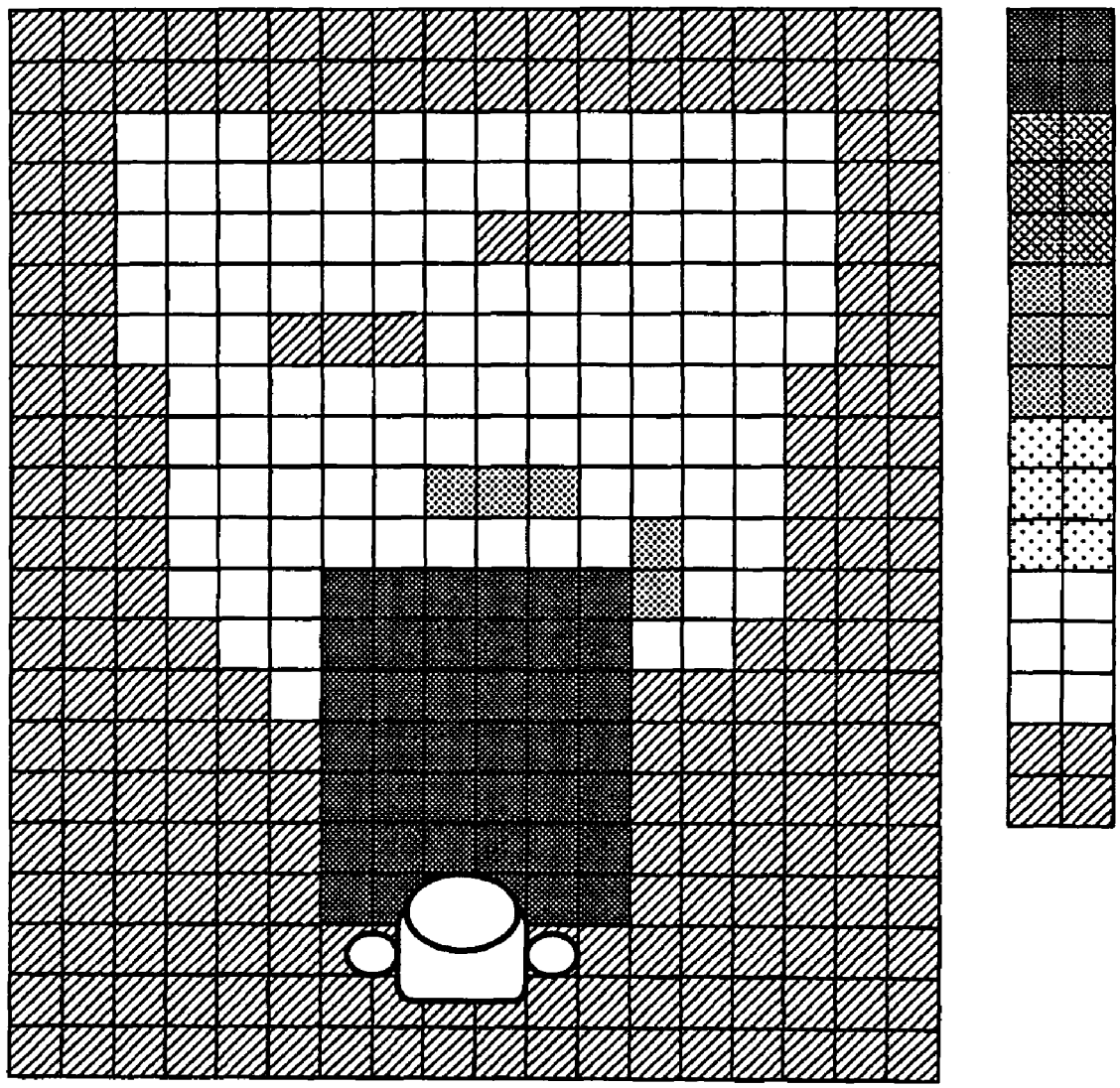
FIG. 30 is a schematic illustration of an environment map built by the robot apparatus on the basis of the state of FIG. 28.

FIG. 28 is a schematic illustration of a state where the robot apparatus 201 finds a box Z in its visual field and recognizes it. FIG. 29 is a schematic illustration of a state where the box Z of FIG. 28 is missing. FIG. 30 is a schematic illustration of an environment map built by the robot apparatus 201 on the basis of the state of FIG. 28. The cells are discriminated by shading to indicate that they have different pieces of height information h. FIG. 30 shows that the robot apparatus 201 detects a plane that corresponds to the box Z placed in front of it.

Figure 31:
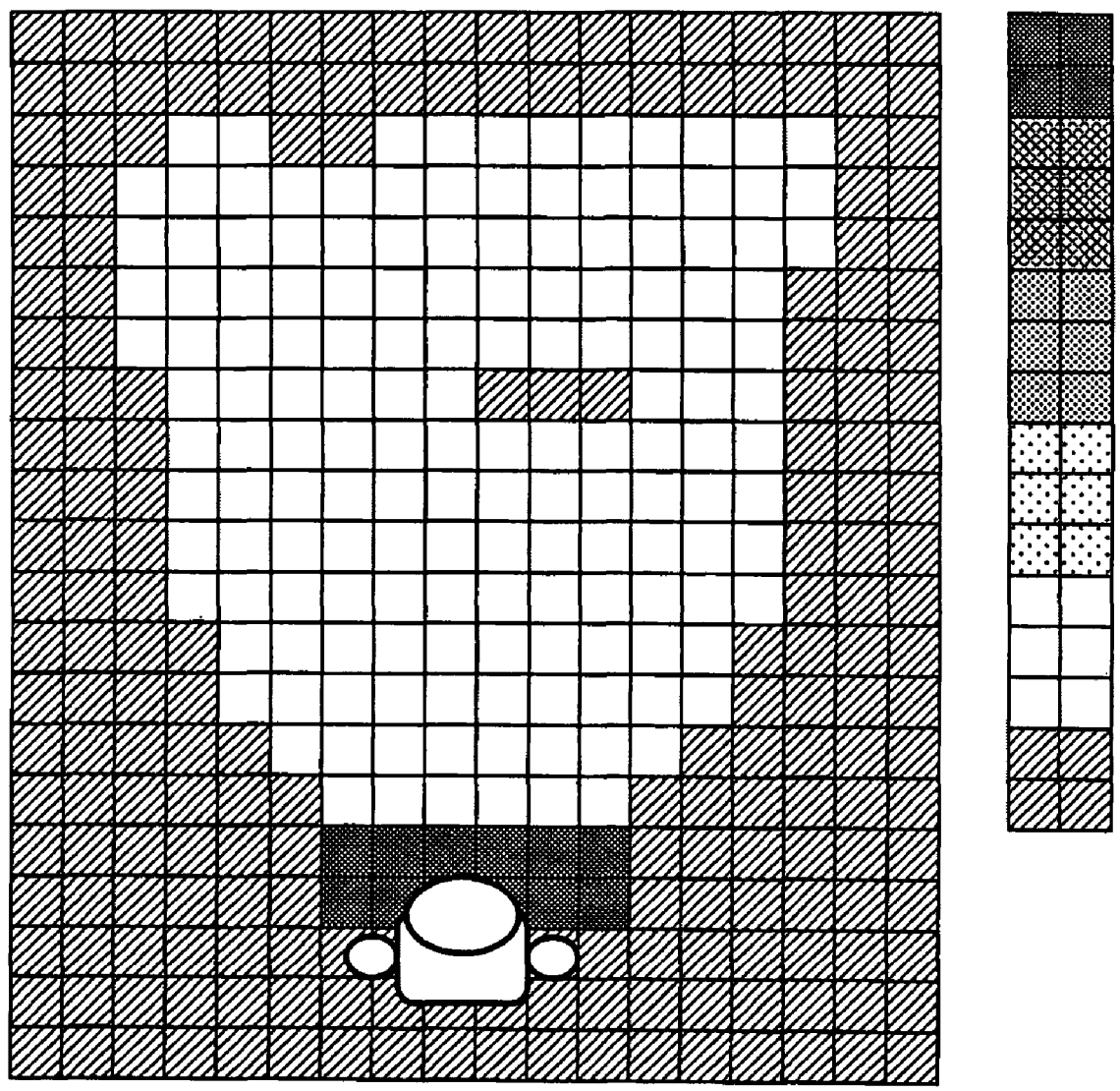
FIG. 31 is a schematic illustration of an environment map built only from a 2.5-D height map.
Figure 32:
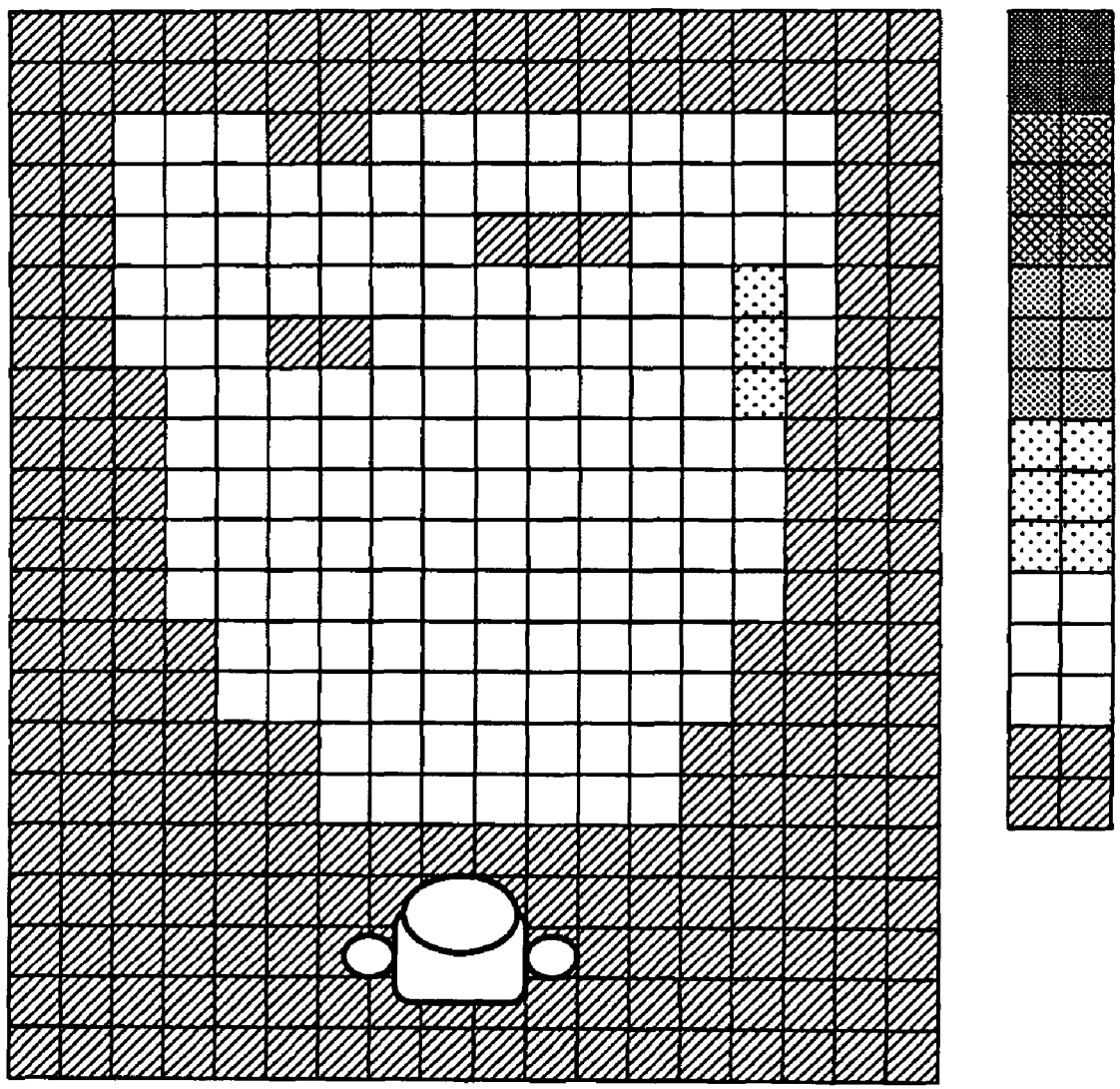
FIG. 32 is a schematic illustration of an environment map built from a 2.5-D height map and complemented by a three-dimensional grid.

FIG. 31 is a schematic illustration of an environment map built only from the 2.5-D height map. FIG. 32 is a schematic illustration of an environment map built from the 2.5-D height map and complemented by the three-dimensional grid. In the former environment map, the cells of the region that the robot apparatus 201 recognized when the box Z was there but can no longer see it have not been updated due to the problem pointed out earlier by referring to FIGS. 1 and 2 although the box Z has been removed and hence the plane of the box Z is no longer there. Thus, part of the box Z is erroneously recognized as a plane. In the latter environment map built by the environment map building method according to the embodiment of the invention, on the other hand, the residual cells are properly updated as a result of a verification process using the algorithm for building the three-dimensional grid.

2. When a Plane has been Moved

Figure 33:
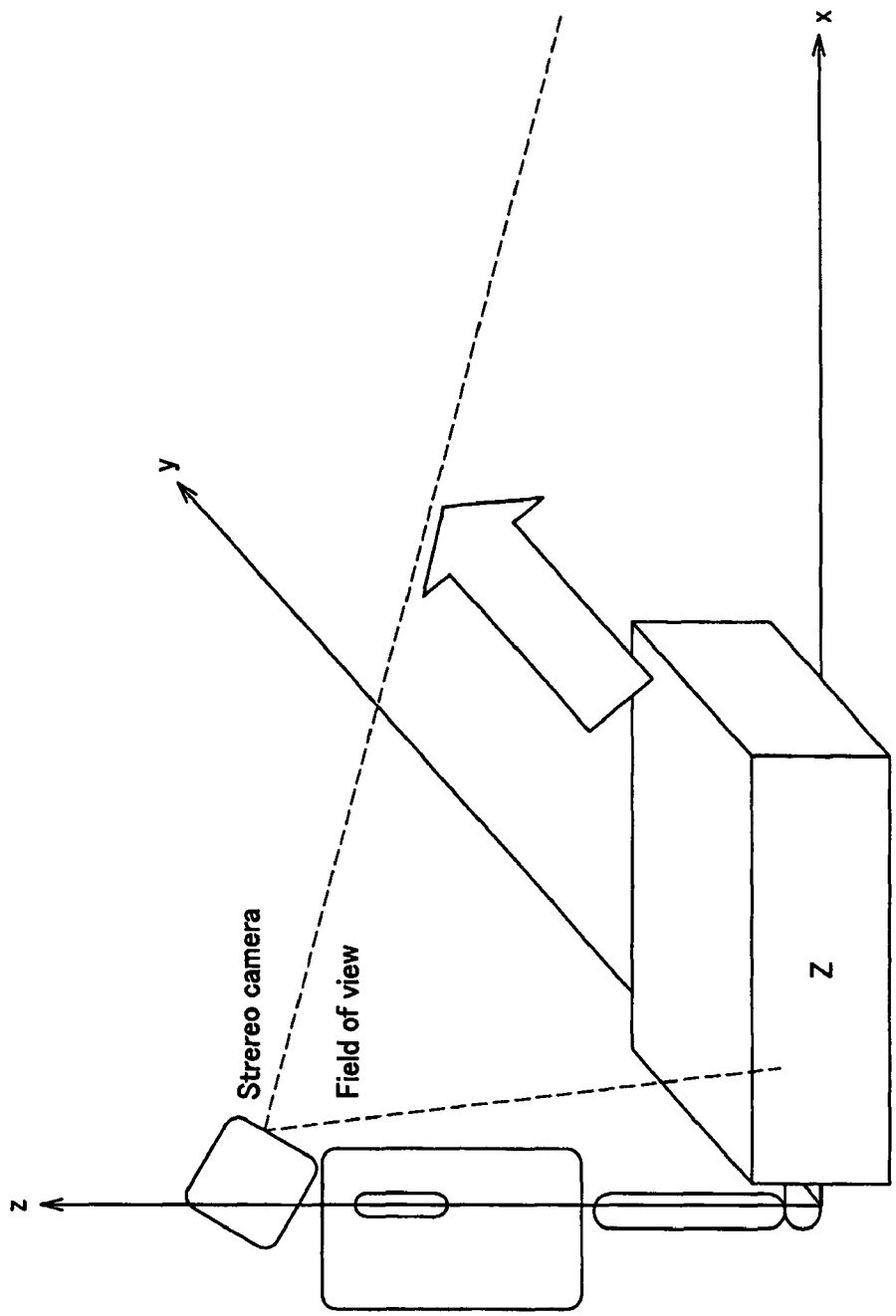
FIG. 33 is another schematic illustration of a state where a robot apparatus finds a box Z in the visual field of the robot apparatus and recognizes it.
Figure 34:
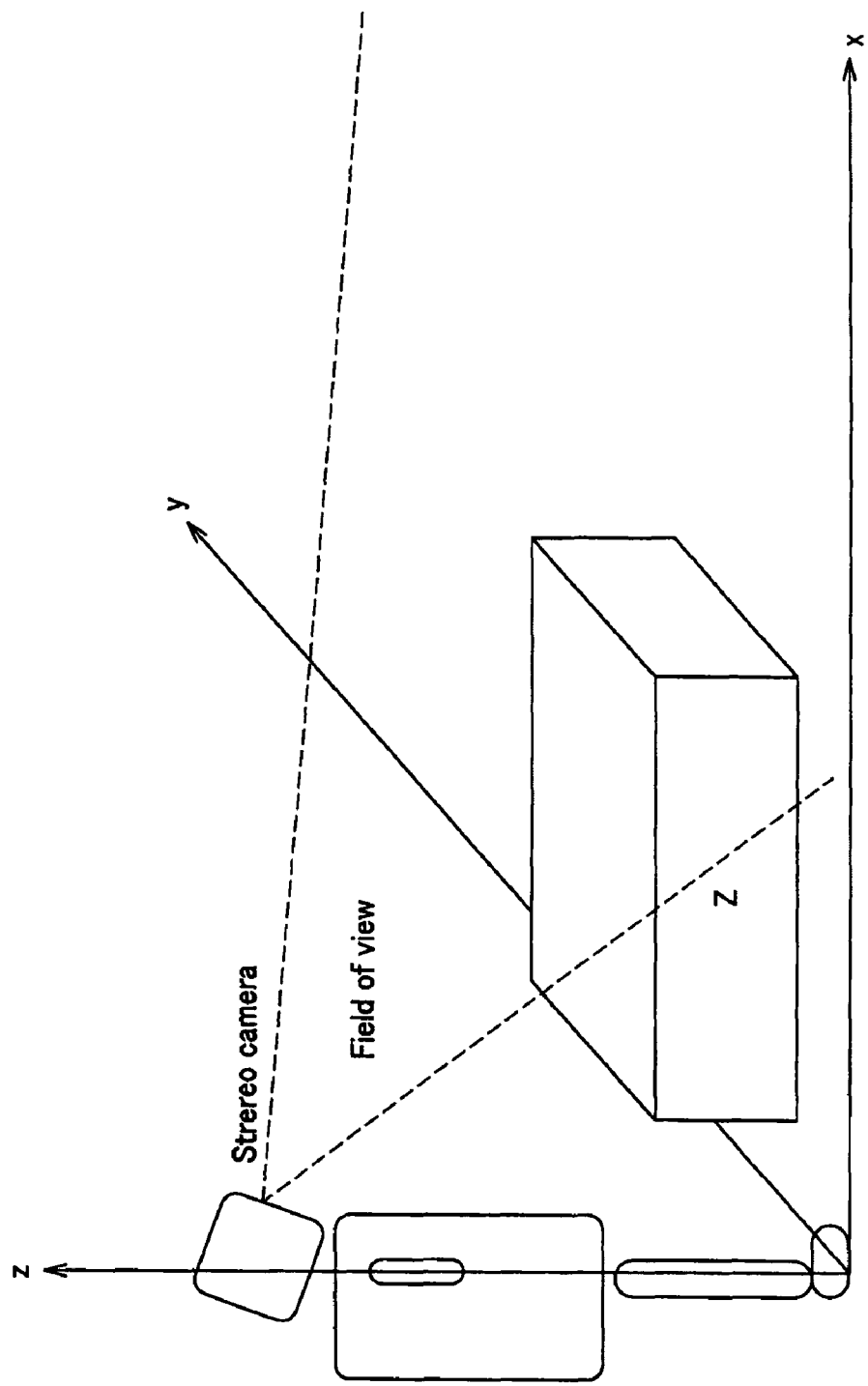
FIG. 34 is a schematic illustration of a state where a box Z that is not found in the state of FIG. 33 is moved into the visual field of the robot apparatus of FIG. 28.
Figure 35:
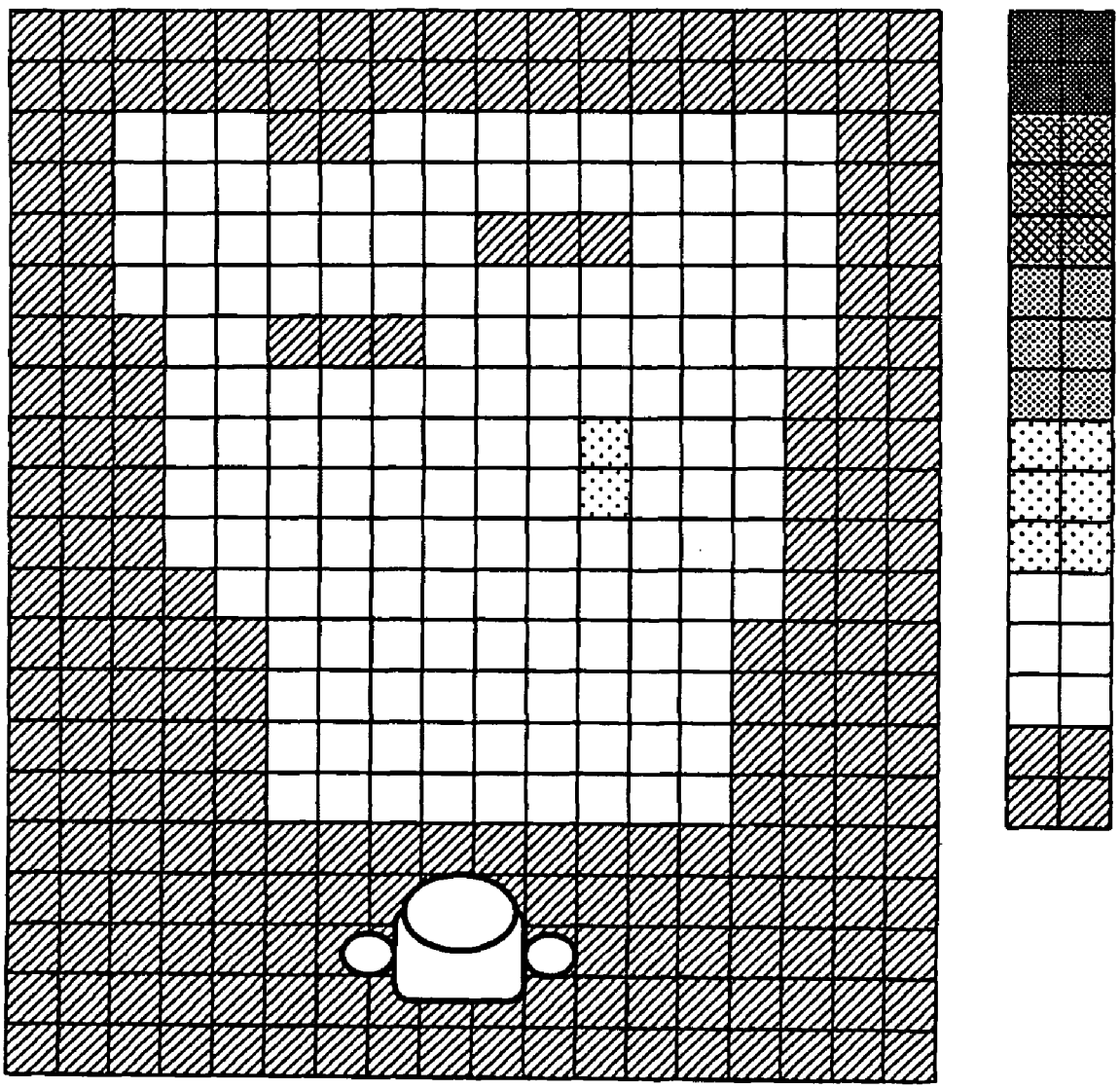
FIG. 35 is a schematic illustration of an environment map built by the robot apparatus from the state of FIG. 33.

In this instance, no object is placed in front of the robot apparatus 201 in the beginning and, after a while, a box Z is gradually moved into the visual field of the robot apparatus 201 from the outside of the visual field. FIGS. 33 and 34 show how the robot apparatus 201 recognizes the box Z in its visual field. FIG. 34 is a schematic illustration of a state where a box Z that is not found in the state of FIG. 33 is moved into the visual field of the robot apparatus 201. FIG. 35 is a schematic illustration of an environment map built by the robot apparatus 201 from the state of FIG. 33. The cells are discriminated by shading to indicate that they have different pieces of height information h.

Figure 36:
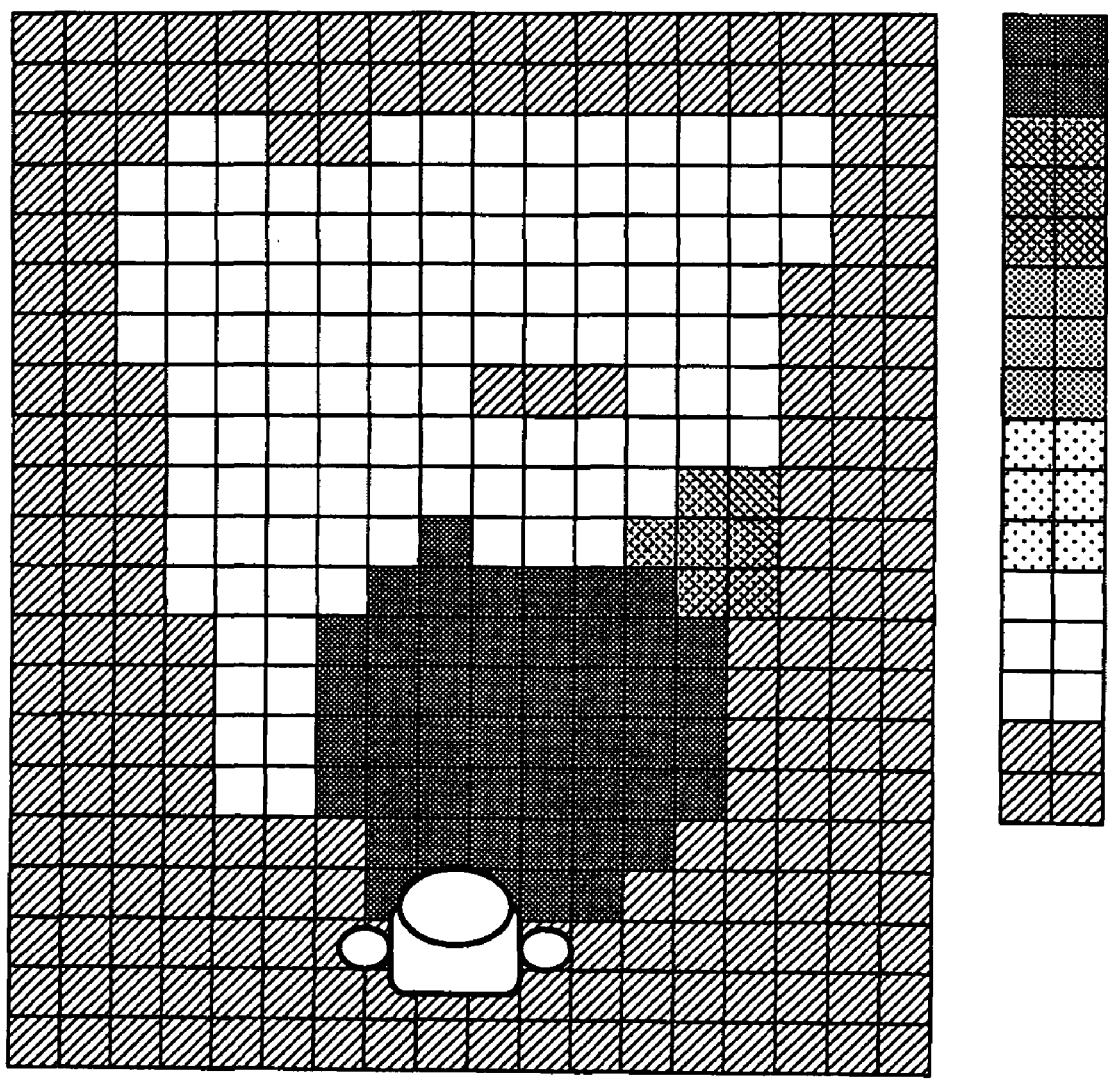
FIG. 36 is a schematic illustration of an environment map built only from a 2.5-D height map.
Figure 37:
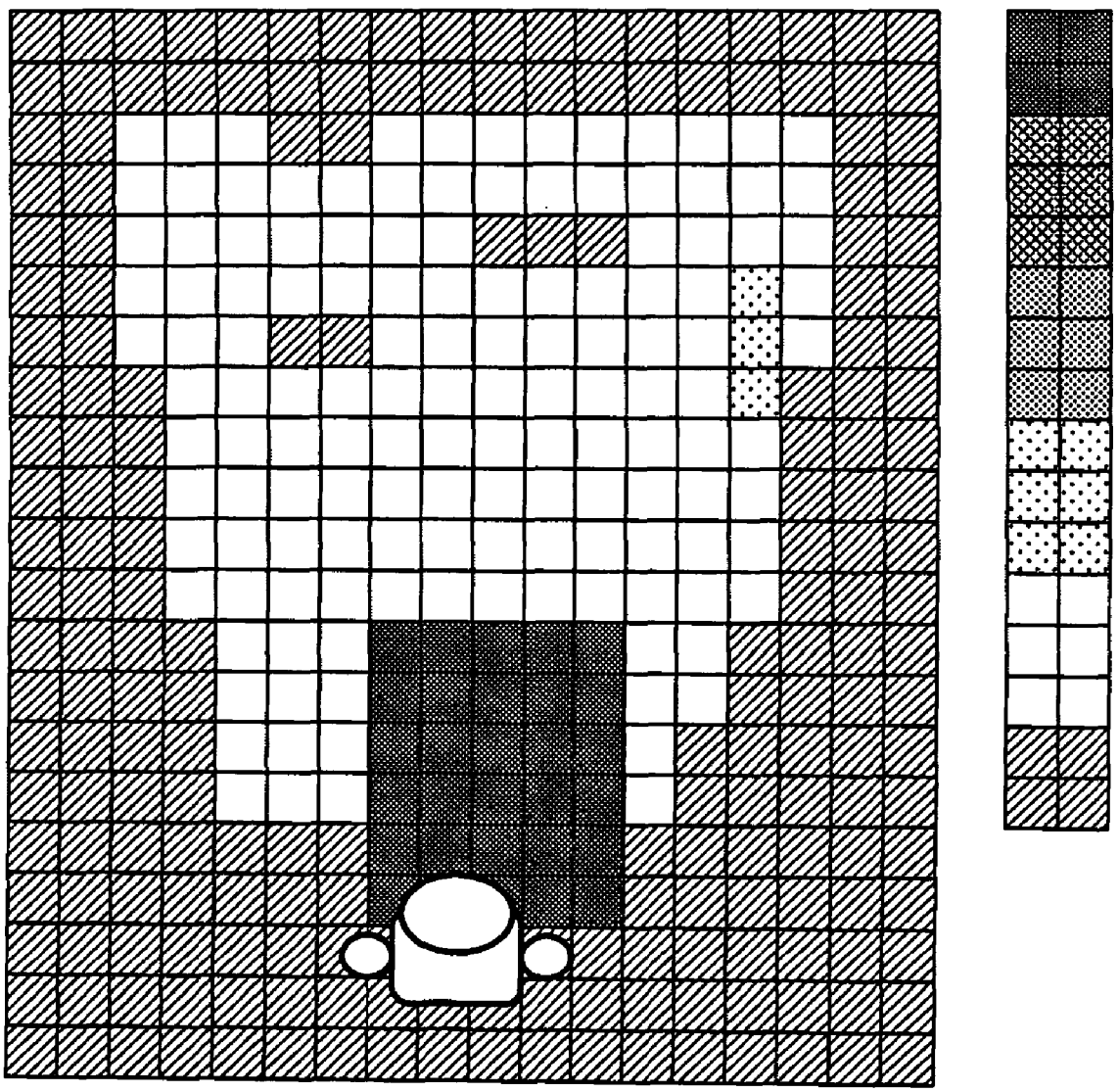
FIG. 37 is a schematic illustration of an environment map built from a 2.5-D height map and complemented by a three-dimensional grid.

FIG. 36 is a schematic illustration of an environment map built only from the 2.5-D height map. FIG. 37 is a schematic illustration of an environment map built from the 2.5-D height map and complemented by the corresponding three-dimensional grid. In the former environment map, the cells that are hidden by the top surface of the box Z that has been moved in and become invisible from the robot apparatus 201 are erroneously recognized as the original plane. In the latter environment map built by the environment map building method according to the embodiment of the invention, on the other hand, the residual cells are properly updated as a result of a verification process using the algorithm for building the three-dimensional grid.

Thus, the robot apparatus 201 can determine its moving route by means of the route determining section (path planner) 7 on the basis of the environment map built by means of the above described environment map building method. When determining the moving route, the technique of confirming the movable region by actually moving in the environment (space S500) recognized on the basis of the environment map may be used along with the technique of searching for the moving route by means of the conventional two-dimensional grid.

As described above, with the environment map building method according to the embodiment of the invention, only the detected planes are expressed in the 2.5-D height map and all the other cells are expressed as obstacles. Height information h is applied to the cells. The levels that the robot apparatus 201 cannot step up as indicated by the height information h may be expressed as obstacles or staircases.

Thus, with the environment map building method according to the embodiment of the invention, it is possible to build an environment map that is highly robust against observation noises by complementing a 2.5-D plane map that is weak relative to observation noises by a three-dimensional grid adapted to statistically process the obstacle existence probability of each cell. While a three-dimensional grid may reduce the processing speed when the detection accuracy has to be raised because the vertical resolution relies on the cell size, the environment map building method according to the embodiment of the invention makes it possible to accurately express heights with a relatively small amount of data because the height information h can be held as analog values for the 2.5-D height map by using a three-dimensional grid built with a relatively coarse resolution to suppress the quantity of computations. Thus, the environment map building method according to the invention dissolves the problem of the weakness relative to observation noises while it fully exploits a 2.5-D height map that is advantageous when fine resolutions are required in the height direction to detect planes and staircases that a robot apparatus can step up.

It should be understood by those skilled in the art that various modifications, combinations, sub-combinations and alternations may occur depending on design requirements and other factors insofar as they are within the scope of the appended claims or the equivalents thereof.

What is claimed is:

1. A method for a device to build an environment map of an environment, the method comprising:
   detecting external environment conditions in the environment;
   building the three-dimensional map showing a state of occupancy of a three-dimensional grid based on the external environment conditions, wherein the three-dimensional grid comprises cells corresponding to box-shaped spaces of the environment;
   building a relative-to-base-plane height map showing heights from a two-dimensional base plane based on the external environment conditions;
   modifying the relative-to-base-plane height map based on the three-dimensional map;
   updating occupancy probability of the cells when height information of the relative-to-base-plane height map corresponds to the cells; and
   controlling moving actions of the device for stepping up a staircase in the environment by using the relative-to-base-plane height map as the environment map, wherein the device steps up the staircase by transmitting infrared rays, the infrared rays forming a random pattern used to acquire a distance image.

2. The method according to claim 1, wherein modifying the relative-to-base-plane height map comprises determining an updated state of occupancy of the three-dimensional grid corresponding to the heights and modifying the relative-to-base-plane height map based on the updated state of occupancy.

3. The method according to claim 1,
wherein detecting the external environment conditions comprises metering three-dimensional distances from a point of observation to points of measurement of an object; and
wherein building the three-dimensional map comprises updating the state of occupancy based on the three-dimensional distances.

4. The method according to claim 1,
wherein detecting the external environment conditions comprises metering three-dimensional distances from a point of observation to points of measurement of an object; and
wherein building the relative-to-base-plane height map comprises detecting one or more planes contained in the environment based on the three-dimensional distances.

5. The method according to claim 3, wherein building the three-dimensional map comprises reducing an occupancy probability contained in straight lines connecting the point of observation and the points of measurement and raising the occupancy probability of unit grids that correspond to the points of measurement.

6. The method according to claim 1, wherein the modifying the relative-to-base-plane height map comprises:
acquiring the height information from the relative-to-base-plane height map;
making the height information correspond to height coordinates of the three-dimensional map;
comparing an occupancy probability of each unit grid with a threshold value;
determining whether the unit grid represents an obstacle in the three-dimensional grid, wherein the unit grid is not an obstacle if the occupancy probability is smaller than the threshold value; and
modifying corresponding height information of the relative-to-base-plane height map when the occupancy probability is greater than the threshold value.

7. The method according to claim 1,
wherein detecting the external environmental conditions comprises detecting real space of the three-dimensional map and the relative-to-base-plane height map;
wherein modifying the relative-to-base-plane height map comprises modifying a region of the relative-to-base-plane height map that corresponds to the real space.

8. The method according to claim 4, wherein detecting the one or more planes comprises:
extracting a line segment for each group of distance data points estimated to be on a same plane in a three-dimensional space;
extracting a plurality of line segments estimated to be belonging to the same plane; and
computationally determining a plane from the plurality of line segments,
wherein extracting the line segment comprises detecting the plane by adaptively extracting line segments according to the distribution of distance data points.

9. A device for building an environment map of an environment, the apparatus comprising:
means for detecting external environment conditions in the environment;
means for building the three-dimensional map showing a state of occupancy of a three-dimensional grid based on the external environment conditions, wherein the three-dimensional grid comprises cells corresponding to box-shaped spaces of the environment;
means for building a relative-to-base-plane height map showing heights from a two-dimensional base plane based on the external environment conditions;
means for modifying the relative-to-base-plane height map based on the three-dimensional map;
means for updating occupancy probability of the cells when height information of the relative-to-base-plane height map corresponds to the cells; and
means for controlling moving actions of the device for stepping up a staircase in the environment by using the relative-to-base-plane height map as the environment map, wherein the device steps up the staircase by transmitting infrared rays, the infrared rays forming a random pattern used to acquire a distance image.

10. The apparatus according to claim 9, wherein modifying the relative-to-base-plane height map comprises determining an updated state of occupancy of the three-dimensional grid corresponding to the heights and modifying the relative-to-base-plane height map based on the updated state of occupancy.

11. The apparatus according to claim 9, wherein detecting the external environment conditions comprises metering three-dimensional distances from a point of observation to points of measurement of an object; and
wherein building the three-dimensional map comprises updating the state of occupancy based on the three-dimensional distances.

12. The apparatus according to claim 9, wherein detecting the external environment conditions comprises metering three-dimensional distances from a point of observation to points of measurement of an object; and
wherein building the relative-to-base-plane height map comprises detecting one or more planes contained in the environment based on the three-dimensional distances.

13. A mobile apparatus comprising:
means for detecting external environment conditions in an environment;
means for building a three-dimensional map of an environment showing a state of occupancy of a three-dimensional grid based on the external environment conditions, wherein the three-dimensional grid comprises cells corresponding to box-shaped spaces of the environment;
means for building a relative-to-base-plane height map showing heights from a two-dimensional base plane based on the external environment conditions;
means for modifying the relative-to-base-plane height map based on the three-dimensional map;
means for updating occupancy probability of the cells when height information of the relative-to-base-plane height map corresponds to the cells; and
means for autonomously determining a moving route for the mobile apparatus, using the relative-to-base-plane height map as an environment map and controlling moving actions of the mobile apparatus based on the moving route, the moving route comprises stepping up a staircase, wherein the mobile apparatus steps up the staircase by transmitting infrared rays, the infrared rays forming a random pattern used to acquire a distance image.

* * * * *